(12) United States Patent
Honda et al.

(10) Patent No.: US 8,720,940 B2
(45) Date of Patent: May 13, 2014

(54) SIDE AIRBAG APPARATUS

(71) Applicant: Toyoda Gosei Co., Ltd., Kiyosu (JP)

(72) Inventors: Kensaku Honda, Kiyosu (JP); Yuji Sato, Kiyosu (JP); Masahi Hotta, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/777,098

(22) Filed: Feb. 26, 2013

(65) Prior Publication Data

US 2013/0234421 A1    Sep. 12, 2013

(30) Foreign Application Priority Data

Mar. 9, 2012   (JP) ................................ 2012-053299

(51) Int. Cl.
*B60R 21/207*   (2006.01)
*B60R 21/233*   (2006.01)
*B60R 21/237*   (2006.01)

(52) U.S. Cl.
USPC ...... 280/730.2; 280/729; 280/742; 280/743.1

(58) Field of Classification Search
USPC ................. 280/729, 730.2, 742, 743.1, 743.2
See application file for complete search history.

(56) References Cited

U.S. PATENT DOCUMENTS

| | | | | |
|---|---|---|---|---|
| 5,829,779 | A * | 11/1998 | Nakashima et al. ....... | 280/730.2 |
| 5,890,732 | A * | 4/1999 | Nakamura et al. ............ | 280/729 |
| 5,924,721 | A * | 7/1999 | Nakamura et al. ......... | 280/730.2 |
| 5,927,750 | A * | 7/1999 | Nakamura et al. ......... | 280/730.2 |
| 6,142,507 | A * | 11/2000 | Okuda et al. ............... | 280/730.2 |
| 6,142,508 | A | 11/2000 | Lewis | |
| 6,142,517 | A * | 11/2000 | Nakamura et al. ............ | 280/739 |
| 6,224,092 | B1 * | 5/2001 | Sakamoto et al. ......... | 280/730.2 |
| 6,231,070 | B1 * | 5/2001 | Sunabashiri et al. ...... | 280/730.2 |
| 6,279,944 | B1 * | 8/2001 | Wipasuramonton et al. ......................... | 280/730.2 |
| 6,997,473 | B2 * | 2/2006 | Tanase et al. ............... | 280/730.2 |
| 7,156,418 | B2 * | 1/2007 | Sato et al. ................... | 280/730.2 |
| 7,168,736 | B2 * | 1/2007 | Tanase et al. .............. | 280/730.2 |
| 7,396,042 | B2 * | 7/2008 | Mabuchi et al. ........... | 280/730.2 |
| 7,819,419 | B2 * | 10/2010 | Hayashi et al. ............ | 280/730.1 |

(Continued)

FOREIGN PATENT DOCUMENTS

DE    10 2007 000 275 A1    11/2007
JP        2001-001857 A      1/2001

(Continued)

OTHER PUBLICATIONS

Extended European Search Report dated Apr. 13, 2013 issued in corresponding EP patent application No. 13156184.7-1503.

*Primary Examiner* — Paul N Dickson
*Assistant Examiner* — Laura Freedman
(74) *Attorney, Agent, or Firm* — Posz Law Group, PLC

(57) ABSTRACT

A side airbag apparatus includes an inflator, which generates inflation gas in response to an impact applied from a side of a seat of a vehicle, an airbag, which is deployed and inflated forward with inflation gas on a side of an occupant seated in the seat, and an accommodating portion, which accommodates the airbag folded into an accommodation state. The airbag in the accommodation state is formed through first and second folding operations in a state where the airbag is deployed but not inflated. In the first folding operation, an upper portion of the airbag is folded downward. In the second folding operation, which is after the first folding operation, the airbag is folded rearward from front.

8 Claims, 11 Drawing Sheets

(56) References Cited

U.S. PATENT DOCUMENTS

| | | | |
|---|---|---|---|
| 7,905,513 B2* | 3/2011 | Honda | 280/730.2 |
| 7,909,359 B2 | 3/2011 | Inoue et al. | |
| 8,181,989 B2* | 5/2012 | Okuhara | 280/730.2 |
| 2007/0267853 A1 | 11/2007 | Kato et al. | |
| 2007/0284859 A1 | 12/2007 | Kashiwagi | |
| 2009/0206585 A1 | 8/2009 | Honda | |
| 2012/0248746 A1* | 10/2012 | Yamamoto | 280/729 |
| 2012/0248747 A1* | 10/2012 | Sugimoto et al. | 280/729 |
| 2013/0033022 A1* | 2/2013 | Yamamoto | 280/730.2 |
| 2013/0200597 A1* | 8/2013 | Honda et al. | 280/729 |
| 2013/0341896 A1* | 12/2013 | Hotta et al. | 280/742 |

FOREIGN PATENT DOCUMENTS

| | | |
|---|---|---|
| JP | 2007-331401 A | 12/2007 |
| JP | 2008-247212 A | 10/2008 |
| WO | 2010/053088 A1 | 5/2010 |

* cited by examiner

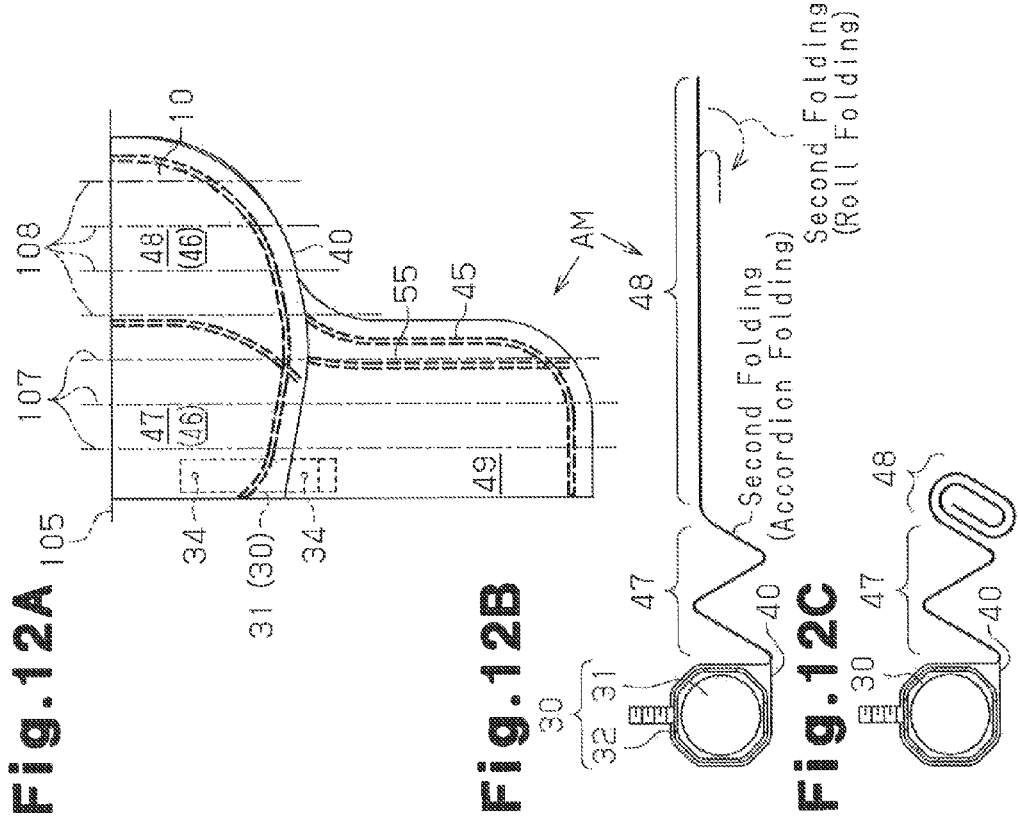
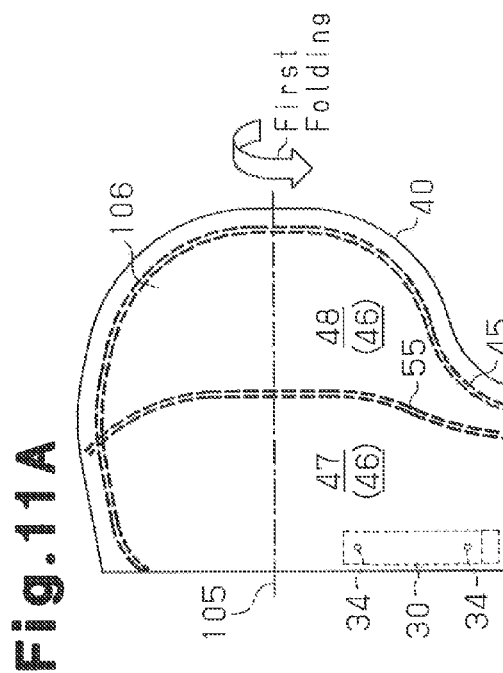
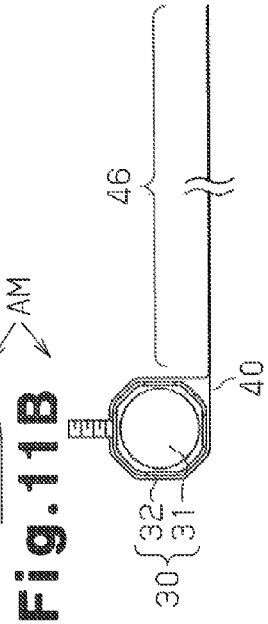

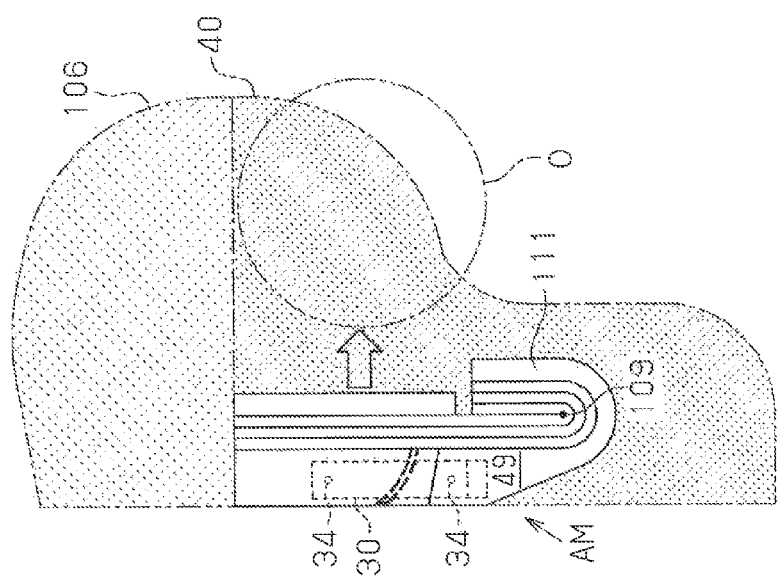
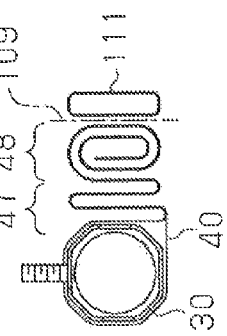
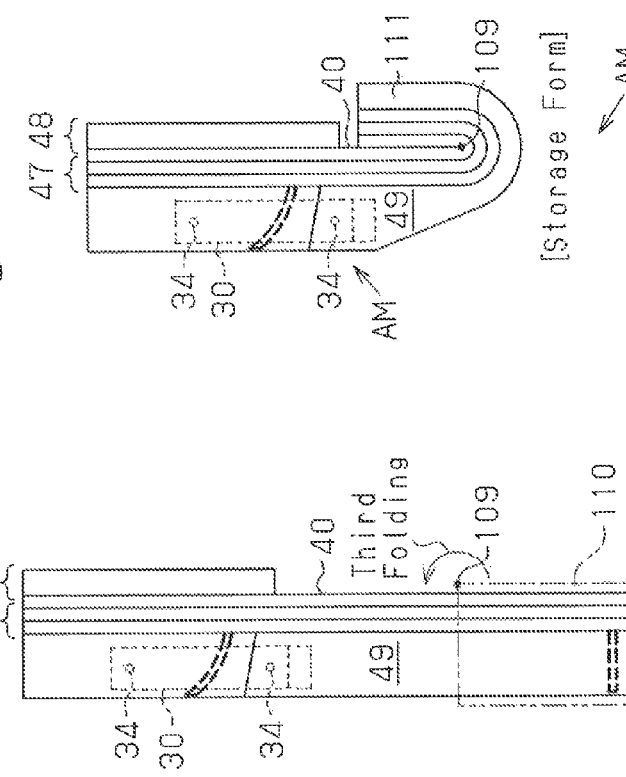
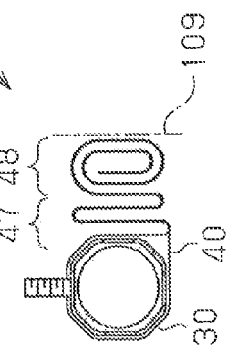

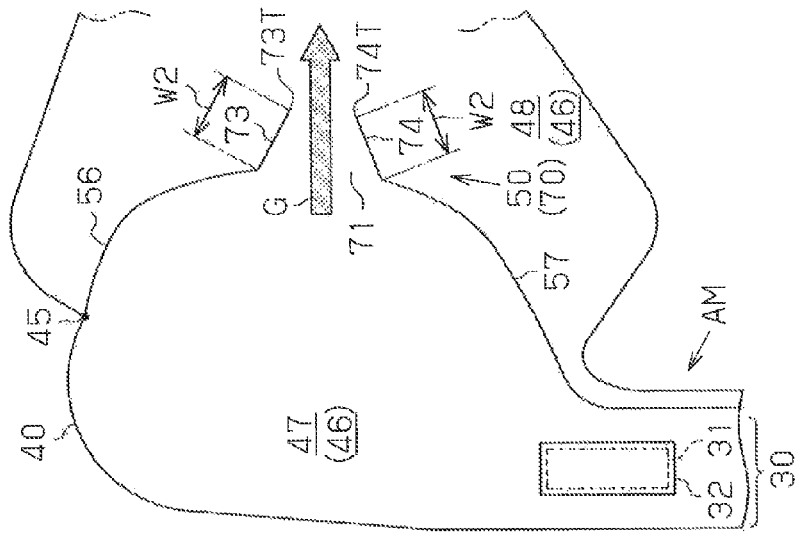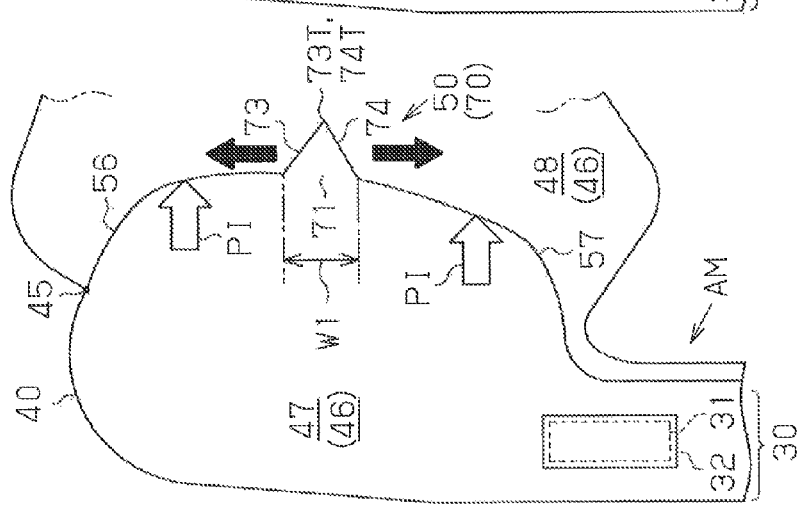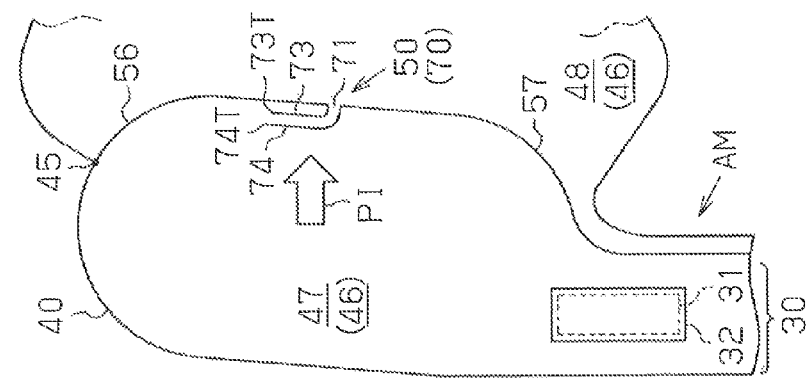

[Transitional Form]

[Storage Form]

SIDE AIRBAG APPARATUS

BACKGROUND OF THE INVENTION

The present invention relates to a side airbag apparatus, which deploys and inflates an airbag on one side of an occupant seated in a seat of a vehicle to protect the occupant from an impact applied to the vehicle from the side of the seat.

A side airbag apparatus is known as an apparatus for protecting an occupant from an impact applied to a body-side portion such as a side door of a vehicle in the event of a side collision. The side airbag apparatus includes an inflator, which spews out inflation gas in response to a side collision of a vehicle, and an airbag, which accommodates the inflator in its rear portion and is deployed and inflated with the inflation gas supplied from the inflator. The airbag and the inflator are accommodated in an accommodating portion provided on one side of an occupant seated in a seat, e.g., on a side in a seat back (backrest).

According to the side airbag apparatus having the above-described configuration, when an impact is applied to the body-side portion from the side in the event of side collision, inflation gas is released from the inflator and supplied into the airbag. The air bag is deployed and inflated with the inflation gas to break the seat back and pops out forward. The airbag is deployed and inflated in a narrow space between the occupant seated in the seat and the body-side portion. The airbag thus deployed and inflated has a size and a shape capable of protecting the occupant. An impact transmitted to the occupant from the side through the body-side portion is alleviated by the airbag.

According to the side airbag apparatus, the accommodating portion is located within the seat back. In the accommodating portion with a limited space, the airbag and the inflator are accommodated. Hence, it is required that the airbag be accommodated in a compact form (accommodation state).

For this purpose, according to a side airbag apparatus described in Japanese Laid-Open Patent Publication No. 2008-247212, an airbag, which has been deployed but not inflated, is folded and accommodated. First, in the airbag deployed but not inflated, a front portion thereof located in front of an inflator is folded rearward from front so that the airbag has a transitional state, in which the airbag is thin and long in the up-down direction as shown in FIG. 19A. An upper portion 203 of the airbag 201 in the transitional state, which is located above the inflator 202, is folded downward, and a lower portion 204 of the airbag 201 is folded upward. Thus folding, the airbag 201 is brought into the accommodation state, which is compact in both the front-rear direction and the up-down direction, as shown in FIG. 19B.

When inflation gas is supplied from the inflator 202 to the airbag 201, which has been brought into the accommodation state as described above and accommodated in the accommodation state in the accommodating portion of the seat back, the portions of the airbag 201 are inflated to be unfolded (deployed) through the reversed order of the above-described folding process. This is because the later-folded portion restricts unfolding of the first-folded portion. In such a conventional side airbag apparatus, the upper portion 203 of the airbag 201, which is folded downward into the accommodation state, is rotated forward and upward around an upper folding line to be unfolded (deployed), as shown by alternate long and two short dashed lines in FIG. 19B. At this time, if an obstacle O exists in front of the upper portion 203 in its deploying direction, the upper portion 203 may strongly push the obstacle O forward and upward, i.e., the upper portion 203 may unnecessarily interfere with the obstacle O.

In the airbag 201 in its accommodation state, the lower portion 204 folded upward is rotated forward and downward around a lower folding line to be unfolded (deployed). The upper portion 203 and the lower portion 204 are rotated as described above, and the airbag 201 in its accommodation state is brought into the transitional state, which is thin and long in the up-down direction as shown in FIG. 19A. The folded state of the airbag 201 in its transitional state is unfolded (deployed) forward from behind.

SUMMARY OF THE INVENTION

Accordingly, it is an objective of the invention to provide a side airbag apparatus capable of preventing an airbag from unnecessarily interfering with an obstacle even when the obstacle exists in front of the airbag in its deploying direction.

To achieve the foregoing objective, and in accordance with one aspect of the present invention, a side airbag apparatus is provided that includes a gas generating source, an airbag, and an accommodating portion. The gas generating source generates inflation gas in response to an impact applied from a side of a seat of a vehicle. The airbag is deployed and inflated forward by the inflation gas on a side of an occupant seated in the seat. The accommodating portion is located in the vicinity of a side of the occupant and accommodates the airbag folded into an accommodation state. The airbag in the accommodation state is formed through first and second folding operations in a state where the airbag is deployed but not inflated. In the first folding operation, an upper portion of the airbag is folded downward. In the second folding operation, which is after the first folding operation, the airbag is folded rearward from front.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 11A is a side view depicting a state before the airbag is folded;

FIG. 11B is a cross-sectional plan view depicting the state shown in FIG. 11A;

FIG. 12A is a side view depicting a state in which an upper portion of the airbag shown in FIG. 11A has been folded downward;

FIG. 12B is a cross-sectional plan view depicting a state in which a portion of the airbag has been folded rearward from front from the state depicted in FIG. 12A;

FIG. 12C is a cross-sectional plan view depicting a state in which the airbag has been further folded from the state depicted in FIG. 12B;

FIG. 13A is a side view depicting a state in which the airbag has been further folded into a transitional state from the state depicted in FIG. 12C;

FIG. 13B is a cross-sectional plan view depicting the state depicted in FIG. 13A;

FIG. 14A is a side view depicting a state in which a lower portion of the airbag in its transitional state depicted in FIG. 13A has been folded upward of a front portion into an accommodation state;

FIG. 14B is a cross-sectional plan view depicting the state depicted in FIG. 14A;

FIG. 15 is a side view schematically depicting a state in which the airbag has been deployed and inflated from its accommodation state in the embodiment depicted in FIG. 1;

FIGS. 18A to 18C are diagrams schematically depicting how the pressure-regulating valve works according to the embodiment shown in FIG. 1;

DETAILED DESCRIPTION OF THE PREFERRED EMBODIMENTS

A side airbag apparatus according to a preferred embodiment of the present invention installed in a vehicle will be described hereinbelow with reference to FIGS. 1 to 18.

In the following, the direction in which a vehicle advances forward will be referred to as the front, and the reverse direction will be referred to as the rear. The middle of the width direction of the vehicle is used as reference in the width direction of the vehicle. A side closer to the middle of the width direction will be referred to as "inner side" of the vehicle, while a side farther from the vehicle center will be referred to "outer side" of the vehicle.

This embodiment is based on the premise that an occupant (adult) having a standard body size is seated in a seat in an ordinary posture.

Figure 1:
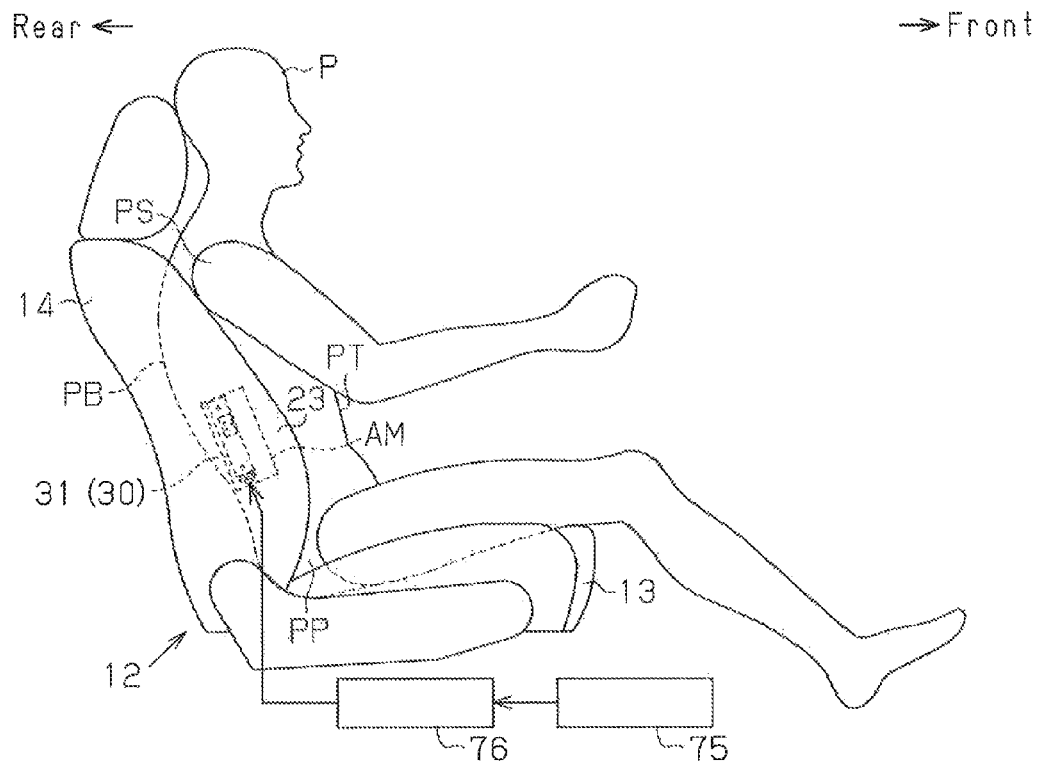
FIG. 1 is a side view depicting an occupant and a seat provided with a side airbag apparatus according to one embodiment of the invention.
Figure 2:
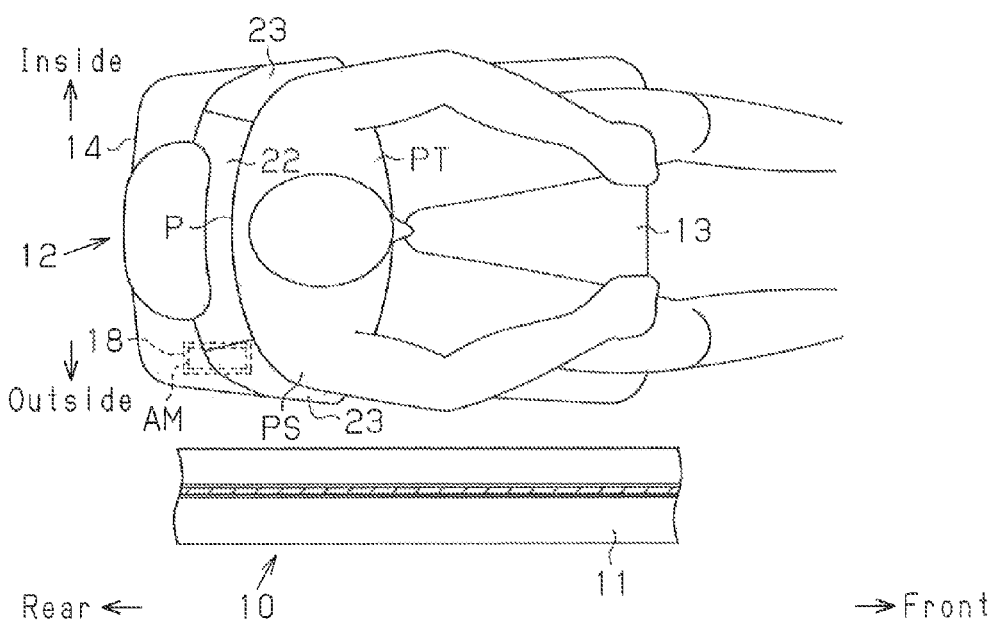
FIG. 2 is a partially cross-sectional plan view depicting a relationship among positions of the seat, the occupant, and a body-side portion of a vehicle according to the embodiment depicted in FIG. 1.

Referring to FIGS. 1 and 2, a seat 12 is installed in the vicinity of a body-side portion 11 of a vehicle 10 in the vehicle interior (an upper side as illustrated in FIG. 2). The body-side portion 11 referred to herein means a combination of constituent components of the vehicle 10 chiefly including a door and a pillar. For example, the body-side portion 11 of a front seat includes a front door and a center pillar (B-pillar). Also, the body-side portion 11 of a rear seat includes a rear part of a side door (rear door), a C-pillar, a front part of a wheel house and a rear quarter panel.

The seat 12 includes a seat cushion 13 and a seat back 14, which extends upward from a rear end of the seat cushion 13. Provided with a reclining mechanism (not shown), the seat back 14 can be adjusted to a desired tilt angle. The seat 12 is installed on the vehicle 10 with the seat back 14 oriented forward. The widthwise direction of the installed seat 12 matches the widthwise direction of the vehicle 10.

The seat back 14 includes a main seat-back portion 22 and a pair of side support portions 23 provided on left and right sides of the main seat-back portion 22. The main seat-back portion 22 is inclined rearward to support an upper part of the body of an occupant P from behind. The side support portions 23 which protrude forward from the main seat-back portion 22 on both sides restrain the occupant P seated on the seat cushion 13 and reclining against the main seat-back portion 22 from moving in the widthwise direction.

Described next hereunder is the internal structure of an outer lateral portion of the seat back 14 including the outside side support portion 23.

Figure 3:
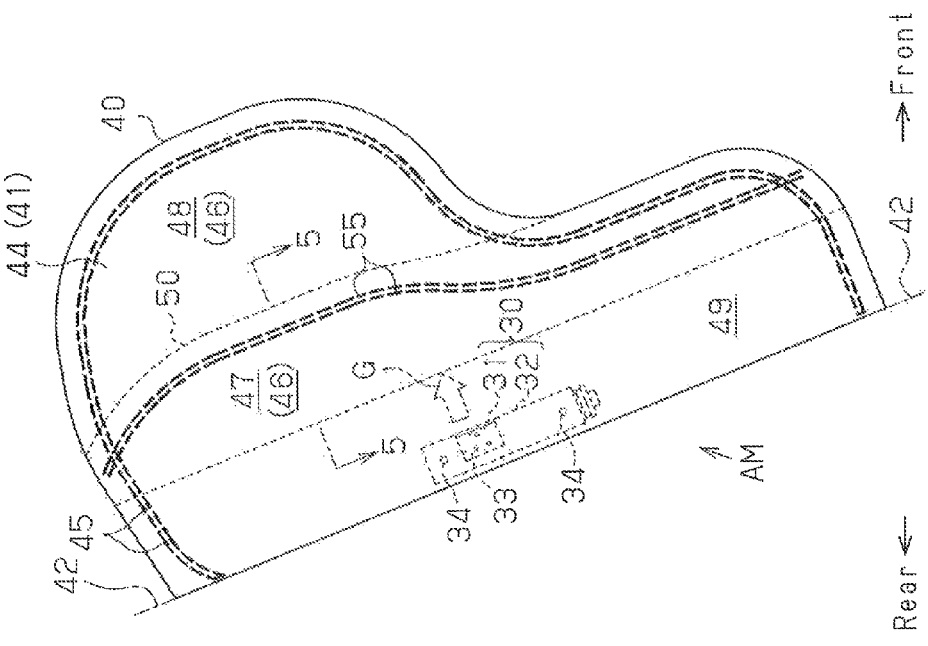
FIG. 3 is a partially cross-sectional plan view depicting an airbag module accommodated in an accommodating portion according to the seat back of the embodiment depicted in FIG. 1.

A seat frame constituting a framework of the seat back 14 is incorporated therein. Part of the seat frame is located in an outer portion (a lower side as illustrated in FIG. 3) of an inside space of the seat back 14. This part of the seat frame is referred to as a side frame portion 15. The side frame portion 15 is formed by bending a metal sheet. A seat pad 16 made of an elastic material like urethane foam is placed in front of the seat frame including the side frame portion 15. Provided behind the seat frame is a back board 17, which is made of a hard material like plastic. While the seat pad 16 has a surface covering, the surface covering is not illustrated in FIG. 3. Likewise, the surface covering of the seat pad 16 is not illustrated in FIG. 6

An accommodating portion 18 is provided in the seat pad 16 close to an outside part of the side frame portion 15. The accommodating portion 18 is located obliquely behind the occupant P seated in the seat 12. The accommodating portion 18 accommodates an airbag module AM which constitutes a principal portion of the side airbag apparatus, the airbag module AM including an inflator assembly 30 and an airbag 40.

The accommodating portion 18 has a corner at an outer front position in which a slit 19 extending outwardly forward is formed. A portion of the seat pad 16 located between a front corner 16C of the seat pad 16 and the slit 19 (i.e., a portion surrounded by a closed alternate long and two short dashed line in FIG. 3) constitutes a breakable portion 21, which will be broken by the airbag 40. The breakable portion 21 is provided on the seat back 14, not on the entire region thereof in the up-down direction, but only on a region corresponding to an upper protecting portion 46 as described below. That is, the breakable portion 21 is not provided on a region corresponding to a lower protecting portion 49.

The components of the airbag module AM will now be described. In the present embodiment, the up-down direction and the front-rear direction of the airbag module AM and its components are defined with reference to the seat back 14 of the seat 12 as shown in FIG. 1. The direction in which the seat back 14 extends upward is defined as the up-down direction of the airbag module AM and its components, and the thickness direction of the seat back 14 is defined as the front-rear direction of the airbag module AM and its components. As described above, the seat back 14 is slightly inclined backward in normal use. Thus, in a strict sense, the up-down direction of the airbag module AM and its components does not match the up-down direction (vertical direction) of the vehicle 10, but is slightly inclined. Likewise, the front-rear direction of the airbag module AM and its components does not match the front-rear direction of the vehicle (the horizontal direction), but is slightly inclined.

<Inflator Assembly 30>

Figure 4:
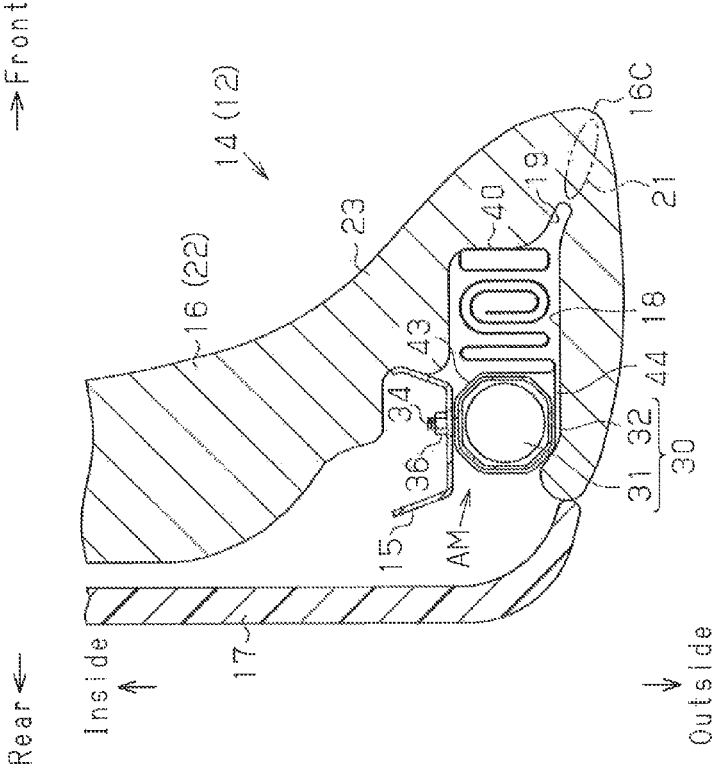
FIG. 4 is a side view of the airbag module in a state in which an airbag has been deployed but not yet inflated according to the embodiment depicted in FIG. 1.

Referring to FIGS. 3 and 4, the inflator assembly 30 includes an inflator 31, which is a gas generating source, and a retainer 32 provided on the outside of the inflator 31. The present embodiment employs a pyrotechnic type inflator as the inflator 31. Having generally a cylindrical shape, the inflator 31 contains in the internal space thereof a gas generating agent (not shown) from which inflation gas G is released. A cable harness (not shown) containing wires for feeding an activation signal to the inflator 31 is connected to one lengthwise end of the inflator 31 (a lower end in the present embodiment).

Instead of the pyrotechnic type inflator, which uses the aforementioned gas generating agent, a hybrid-type inflator, which spews out inflation gas by breaking a partition of a high-pressure steel gas cylinder, which contains high-pressure gas filled therein, may be employed as the inflator 31.

The retainer 32, on the other hand, functions as a diffuser and serves also to join the inflator 31 to the side frame portion 15 together with the airbag 40. A major part of the retainer 32 forms a generally cylindrical shape obtained by bending a metal sheet. A window 33 is formed in the retainer 32 so that most of the inflation gas G released from the inflator 31 spews out of the retainer 32 through this window 33.

A plurality of bolts 34 used for attaching the retainer 32 to the side frame portion 15 is fixed to the retainer 32. Expressed differently, the plurality of bolts 34 are indirectly fixed to the inflator 31 via the retainer 32.

The inflator assembly 30 may be configured with the inflator 31 and the retainer 32 formed integrally as a single-structured unit.

<Airbag 40>

Figure 16:
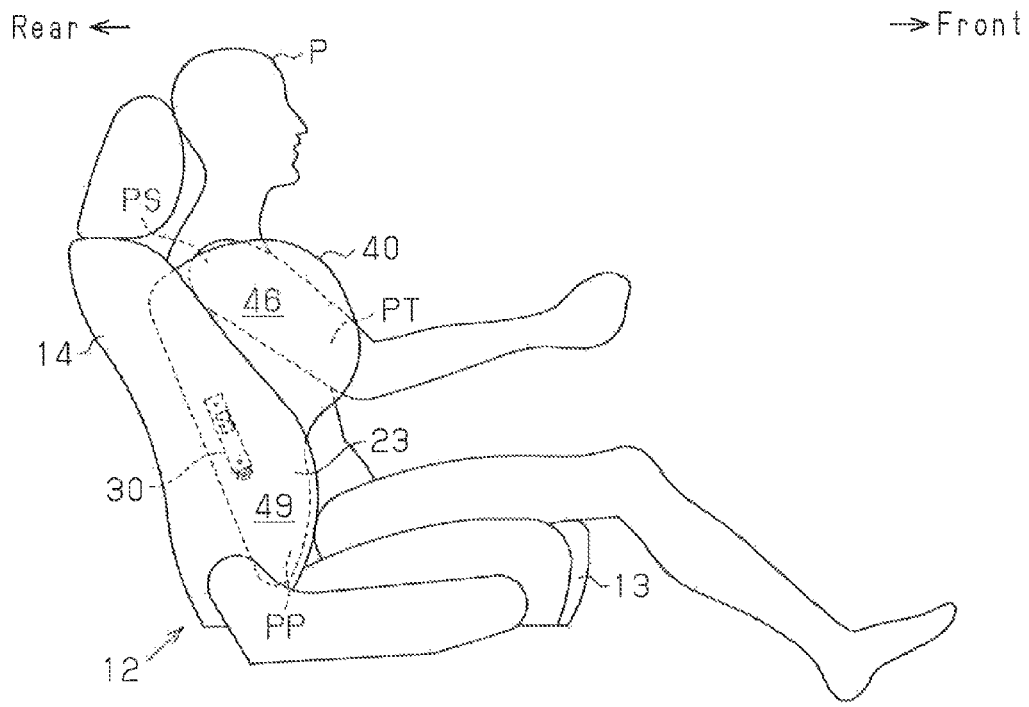
FIG. 16 corresponds to FIG. 1 and is a side view depicting a state in which the upper protecting portion and the lower protecting portion have been deployed and inflated.
Figure 17:
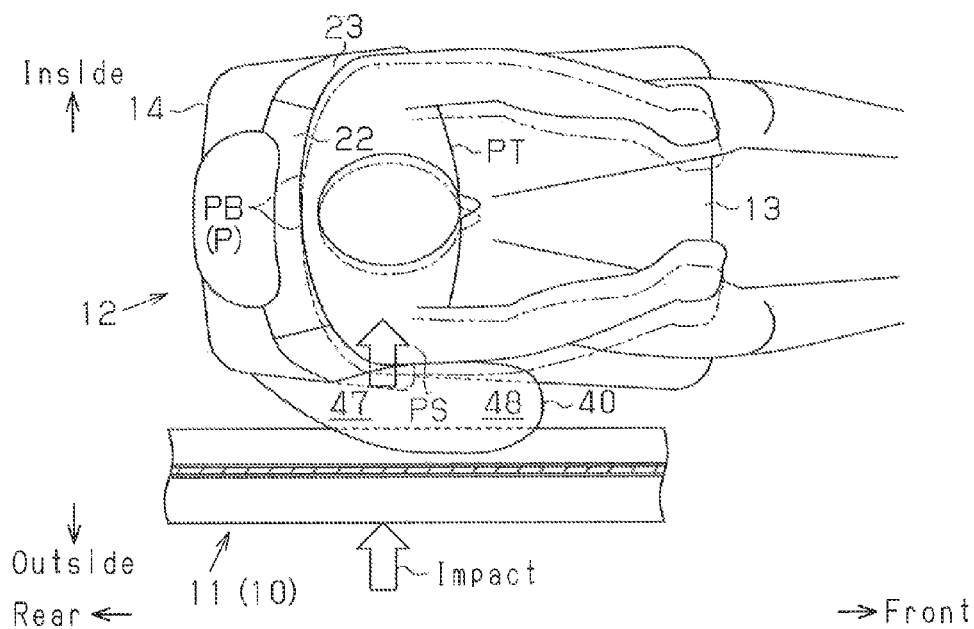
FIG. 17 corresponds to FIG. 2 and is a cross-sectional plan view depicting a state in which an upstream section and a downstream section have been deployed and inflated.

Referring to FIGS. 16 and 17, the inflation gas G released from the inflator 31 is fed into the airbag 40 when an impact is applied to the vehicle 10 (body-side portion 11) from the side of the seat 12 in the event of a side collision, for instance. In this case, the airbag 40 is deployed and inflated generally forward from the seat back 14 with part of the airbag 40 left within the accommodating portion 18. The airbag 40 deployed and inflated is positioned in the vicinity of the occupant P seated in the seat 12, that is, between the upper part of the body of the occupant P and the body-side portion 11 in this embodiment, to protect most of the upper part of the body of the occupant P from the impact caused by the side collision.

Figures 7A, 7B:
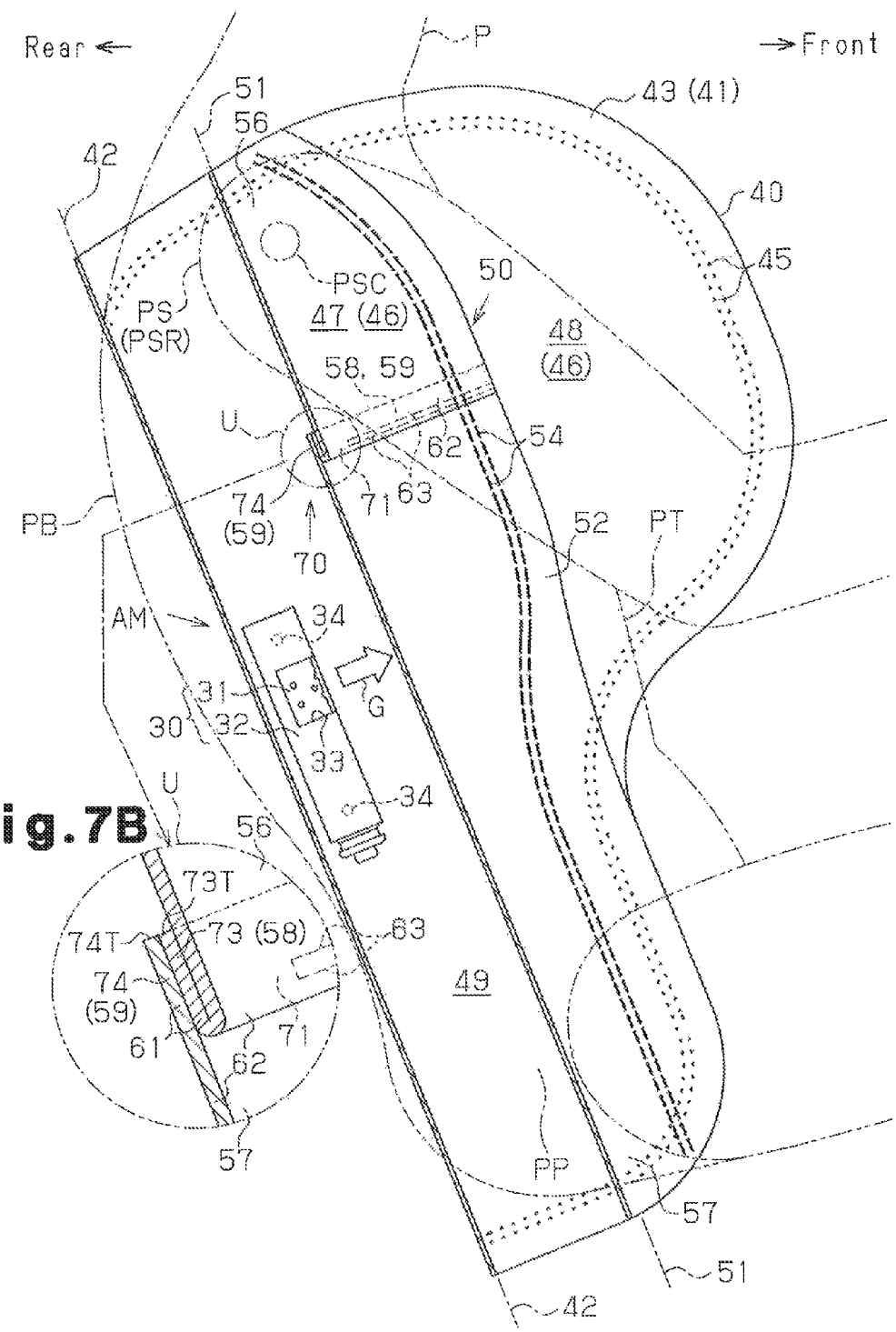
FIG. 7A is a partially cross-sectional side view of the airbag module, of which the airbag is sectioned at the middle of the width thereof in the state depicted in FIG. 4 where the airbag has been deployed but not yet inflated.
FIG. 7B is an enlarged partial cross-sectional side view of a portion marked by a circle U in FIG. 7A.

FIG. 4 depicts the airbag module AM in a state in which the airbag 40 has been deployed in a flat shape but not yet inflated. Also, FIGS. 7A and 7B depict the internal structure of the airbag module AM together with the seat 12 and the occupant P. FIG. 7A depicts the airbag module AM of which airbag 40 is sectioned at the middle of the width thereof in the state depicted in FIG. 4.

Referring to FIGS. 4, and 7A, the airbag 40 is formed by folding a piece of fabric 41 (i.e., base fabric, also known as panel fabric) in half widthwise along a folding line 42 defined on a center line of the fabric 41 and joining overlapped parts of the folded fabric 41 together along an outer edge thereof to form the shape of a bag. For the sake of explanation in this description, a portion of the folded fabric 41 of the airbag 40 placed inside is referred to as a fabric portion 43 (refer to FIG. 7A) and a portion of the folded fabric 41 placed outside is referred to as a fabric portion 44 (refer to FIG. 4) to distinguish between these portions.

While the fabric 41 is folded in half such that the folding line 42 is located at a rear end of the airbag 40, the fabric 41 may be folded in half such that the folding line 42 is located at another end of the airbag 40, such as a front end, an upper end or a lower end thereof. Also, the airbag 40 may be formed from two pieces of fabric divided along the aforementioned folding line 42. In this case, the airbag 40 is formed by laying one piece of fabric on another widthwise and joining the two pieces of fabric to together form the shape of a bag. Furthermore, the airbag 40 may be formed from three or more pieces of fabric.

The two fabric portions 43, 44 of the airbag 40 are symmetrical in outer shape with respect to the folding line 42. The shape and size of each of the fabric portions 43, 44 are determined such that the airbag 40 aligns with most of the upper part of the body of the occupant P seated in the seat 12 (including such portions of the body as lumbar region PP, thorax PT and shoulder PS) when the airbag 40 is deployed and inflated between the seat 12 and the body-side portion 11.

A material suited for the aforementioned fabric portions 43, 44 is a woven fabric made of polyester or polyamide fibers, for instance, which has high strength and flexibility and can be easily folded.

The two fabric portions 43, 44 are joined together along a peripheral joint part 45 provided on peripheries of the fabric portions 43, 44. In this embodiment, the peripheral joint part 45 is formed by stitching peripheral portions of the fabric portions 43, 44 excluding rear ends thereof (i.e., the vicinity of the folding line 42).

In FIGS. 4, 7A, 8, 9, 11A, 12A, 13A, 14A, and 15 stitched portions of the airbag 40 are represented by two kinds of lines. One of these kinds of lines is a broken line, which represents each of the stitched portions (refer to FIG. 4) as seen from the outside of the airbag 40. The other kind of line is a dotted line, which represents how the stitched portions of the airbag 40 are formed between the fabric portions 43, 44 (refer to the peripheral joint part 45 depicted in FIG. 7A). That is to say, the drawings representing the stitched portions by dotted lines depict a cross-sectional structure along a plane that cuts the stitched portions.

Referring to FIGS. 4 and 7A, when a portion of the airbag 40 confined by the peripheral joint part 45 of the fabric portions 43, 44 is filled with the inflation gas G, this portion is deployed and inflated on one side of the upper part of the body of the occupant P to thereby protect most of the upper part of the body of the occupant P from an impact.

The peripheral joint part 45 may be formed by bonding the peripheries of the fabric portions 43, 44 with an adhesive, for example.

The inflator assembly 30 is located generally in the up-down direction of the seat back 14 in a rear end portion of the airbag 40. The bolts 34 of the retainer 32 are passed through the inside fabric portion 43 (refer to FIG. 3). The bolts 34 are passed and fastened in this way to position and fix the inflator assembly 30 relative to the airbag 40.

An inflatable portion of the airbag 40 is divided into a plurality of sections by a partitioning member 50, which extends in a sheet form within the inflatable portion. The partitioning member 50 is structured in the same manner as a known tether.

Figure 5:
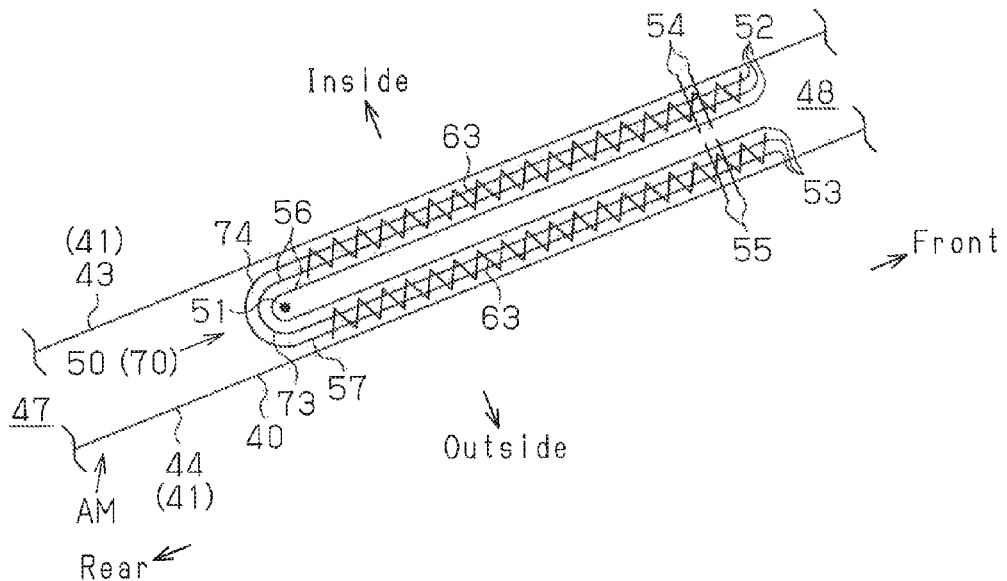
FIG. 5 is an enlarged partial cross-sectional view schematically depicting a cross-sectional structure of a partitioning member taken along line 5-5 of FIG. 4.

FIG. 5 depicts a cross-sectional structure taken along line 5-5 of FIG. 4. FIG. 5 represents each member without depicting the thickness. When the airbag 40 has been deployed but not yet inflated, the partitioning member 50 is folded in half along a folding line 51, which extends generally in the up-down direction, so that opposite end portions 52, 53 of the partitioning member 50 face close to each other as depicted in FIGS. 5 and 7A. The partitioning member 50, which is folded in half, is located in the inflatable portion such that the folding line 51 is located on an upstream side (i.e., the side close to the inflator 31) of the inflation gas G while the two opposite end portions 52, 53 are located on a downstream side (i.e., the side separated from the inflator 31) of the inflation gas G.

Figure 8:
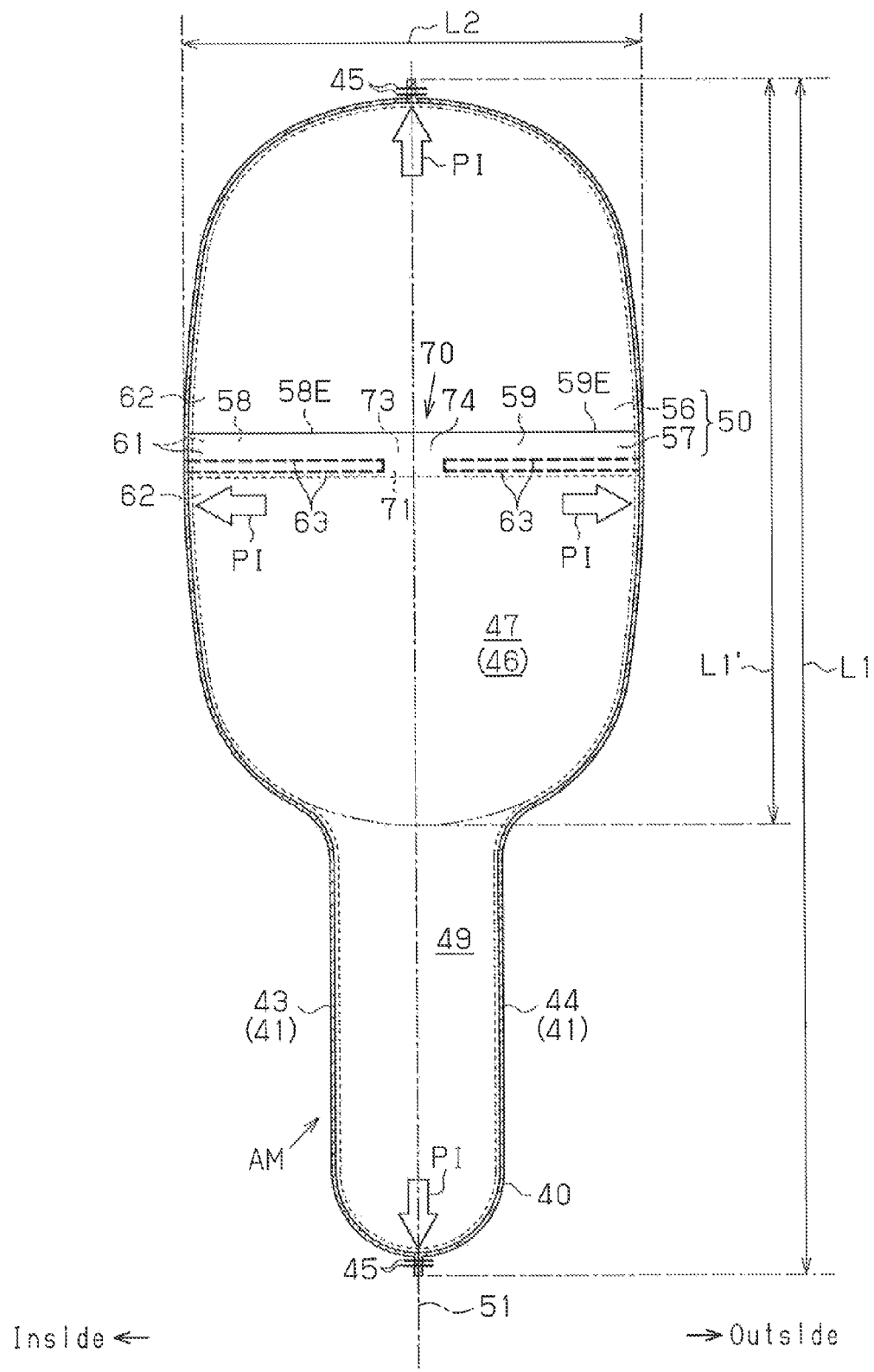
FIG. 8 is a cross-sectional view depicting the internal structure of the airbag module of the embodiment depicted in FIG. 1, in which the partitioning member is stretched tight with the airbag deployed, and inflated as seen from an upstream side.
Figure 9:
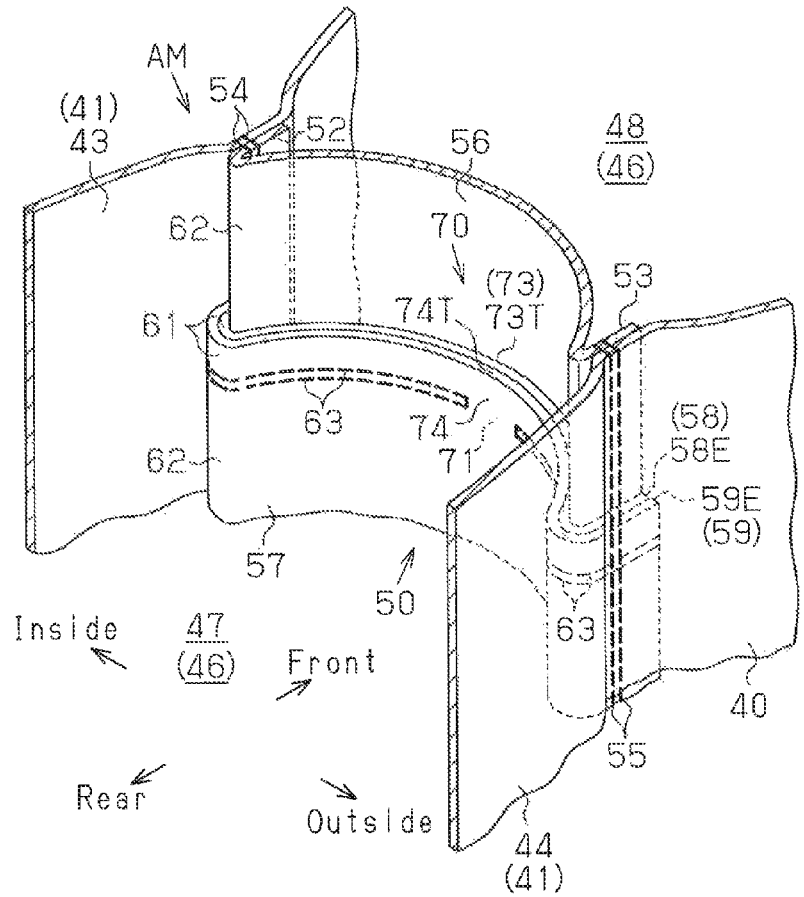
FIG. 9 is a partial perspective view depicting a portion in the vicinity of a pressure-regulating valve provided in the partitioning member of the embodiment depicted in FIG. 1 seen from the upstream side.

The partitioning member 50 is pulled tight when the inflatable portion is deployed and inflated as depicted in FIGS. 8 and 9. At this time, the length L1 of the partitioning member 50 in a direction of the folding line 51 (hereinafter referred to as the longitudinal direction) is larger than the width L2 of the partitioning member 50 in a direction perpendicular to the folding line 51 (hereinafter referred to as the transverse direction). The opposite end portions 52, 53 of the partitioning member 50 are joined to the fabric portions 43, 44 of the airbag 40 at outer joint parts 54, 55 extending generally in the up-down direction, respectively.

As the partitioning member 50 is joined to the airbag 40 in the aforementioned fashion, the partitioning member 50 spans between the inside fabric portion 43 and the outside fabric portion 44. When the airbag 40 has been deployed but not yet inflated, the partitioning member 50 is in a folded-in-half state (refer to FIGS. 5 and 7A). Also, when the airbag 40 has been deployed and inflated, the partitioning member 50 is stretched tight in the widthwise direction of the seat 12 (or of the vehicle 10) (refer to FIGS. 8 and 9) and thereby restrict the width of the inflatable portion of the airbag 40 in the widthwise direction of the vehicle 10.

The folded-in-half partitioning member 50 is joined to the airbag 40 at end portions on both sides of the folding line 51. Specifically, upper and lower ends of the partitioning member 50 are stitched along the aforementioned peripheral joint part 45 (refer to FIG. 7A) together with upper and lower ends of the two fabric portions 43, 44 of the airbag 40, respectively.

As depicted in FIGS. 4 and 7A, the inflatable portion includes the upper protecting portion 46 and the lower protecting portion 49. The upper protecting portion 46 is deployed and inflated firstly in a side portion of the seat back 14, and then breaks the side portion and pops out forward. Thereafter, the upper protecting portion 46 is further deployed and inflated on a side of an upper portion of an upper part of the body of the occupant P.

The partitioning member 50 divides the upper protecting portion 46 of the inflatable portion into an upstream section 47 and a downstream section 48. The upstream section 47 of the inflatable portion is deployed and inflated on a side of a rear-half of the upper portion of the upper part of the body of the occupant P. The downstream section 48 is deployed and inflated on a side of a front-half of the upper portion of the upper part. The rear-half of the upper portion includes a region of the shoulder PS extending at least from a rear end part PSR to a middle part PSC. When the upstream section 47 is thus deployed and inflated, the partitioning member 50 is pulled tight outside of the seat back 14 (in front of a front surface of the seat-back portion 22) (see FIG. 6). The front-half of the upper portion includes the thorax PT.

The lower protecting portion 49 is provided below the upper protecting portion 46 (mainly upstream section 47) in communication with the upper protecting portion 46. The lower protecting portion 49 is deployed and inflated within the seat back 14 on a rear outer side of a lower portion of the upper part of the body of the occupant P. The lower portion of the upper part of the body includes the lumbar region PP.

Figure 10:
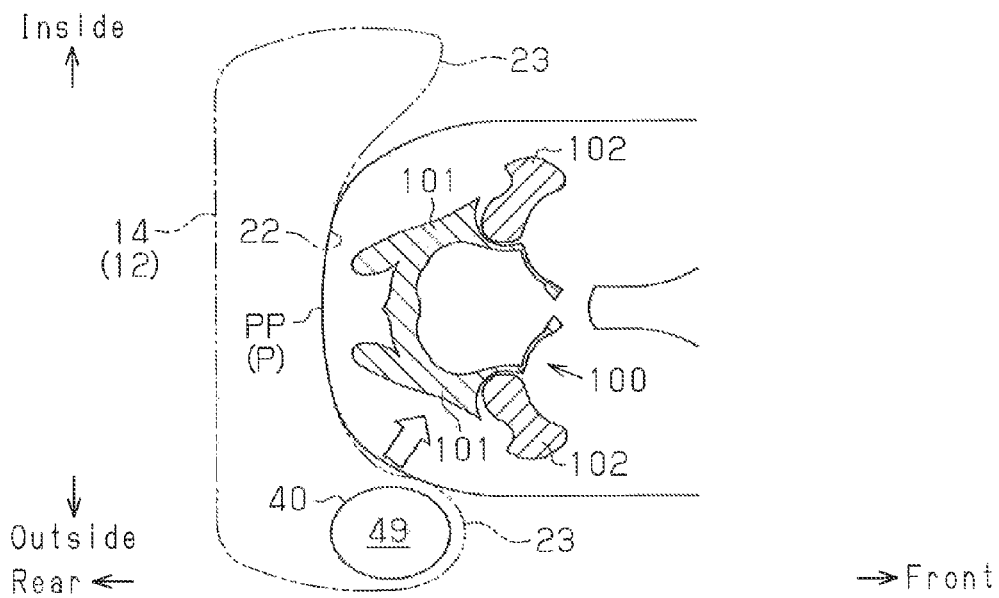
FIG. 10 is a cross-sectional plan view schematically depicting a relationship between the lumbar region of an occupant and the seat back when a lower protecting portion is deployed and inflated in the embodiment shown in FIG. 1.

The lower protecting portion 49 operates to press against the lumbar region PP and move the occupant P inward into the vehicle. This operation becomes more effective as the larger area of the lumbar region PP receives a pressing force from the lower protecting portion 49. However, it is conceived that if at least a rear portion of the lumbar region PP is pressed, the minimum necessary operation is obtained. As shown in FIG. 10 for example, a rear portion of a pelvis 100 i.e., a portion mainly including an ilium 101 has a strong or tough skeleton with respect to a load applied from a side as compared with a portion of the pelvis 100 including a great trochanter 102. Thus, when the rear portion of the pelvis 100 is pushed inward into the vehicle, the occupant P is moved inward into the vehicle (see Japanese Laid-Open Patent Publication No. 2007-8448).

As shown in FIGS. 4 and 7, in order to deploy and inflate the lower protecting portion 49 within the side of the seat back 14, a capacity of the lower protecting portion 49 is subjected to constraints. This is because with the lower protecting portion 49 of a capacity greater than an appropriate value, the side of the seat back 14 is broken when the lower protecting portion 49 is deployed and inflated. Hence, the lower protecting portion 49 is made to be deployed and inflated on a side of the rear portion of the lumbar region PP. According to this configuration, the capacity of the lower protecting portion 49 is reduced as compared with a case where made to be deployed and inflated on a side of the entire lumbar region PP while not exceeding the constrained capacity.

In the embodiment, the partitioning member 50 extends not only into the upper protecting portion 46 but also into the lower protecting portion 49. In the lower protecting portion 49, the partitioning member 50 is provided in the vicinity of a front end portion of the lower protecting portion 49. Hence, the lower protecting portion 49 is not substantially divided. In other words, the partitioning member 50 is provided only in the upper protecting portion 46 as shown by a broken line in which a long dash alternates with a pair of short dashes in FIG. 8, in this case, as shown in FIG. 8, if a length of the partitioning member 50 in the longitudinal direction in the upper protecting portion 46 is defined as L1', the length L1 is shorter than the length L1. However, since the upper protecting portion 46 is inflated long in the longitudinal direction, the length L1' is longer than a length L2 in the transverse direction.

As shown in FIGS. 4 and 7, the inflator assembly 30 is located within any one of the upstream section 47 and the lower protecting portion 49. In the upper protecting portion 46 of the airbag 40 thus configured, the inflation gas G released from the inflator 31 is first supplied into the upstream section 47 of the airbag 40. The inflation gas G, which has been led through the upstream section 47, is then supplied into the downstream section 48, which is located adjacent to a forward part of the upstream section 47.

As depicted in FIGS. 8 and 9, the partitioning member 50 includes an upper part 56 and a lower part 57 that are arranged in the longitudinal (up-down) direction, which is the direction of the folding line 51. Each of the upper and lower parts 56, 57 of the partitioning member 50 is a sheet-like piece made of the same material as the fabric portions 43, 44 of the airbag 40.

End portions 58, 59 of the upper and lower parts 56, 57 of the partitioning member 50 are overlaid with edges 58E, 59E of the end portions 58, 59 aligned with each other, respectively, to form a pair of band-like overlapping portions 61. The upper and lower parts 56, 57 of the partitioning member 50 are joined to each other by a pair of inner joint parts 63 located in boundary areas between the overlapping portions 61 and other portions (hereinafter referred to as non-overlapping portions 62) of the upper and lower parts 56, 57 of the partitioning member 50. The two inner joint parts 63 extend along the direction (transverse direction) perpendicular to the folding line 51 and are located on both sides of an unjoined portion in the vicinity of the folding line 51. The inner joint parts 63 are separated from the edges 58E, 59E of the upper and lower parts 56, 57 of the partitioning member 50 by a specific distance in the up-down direction. The individual inner joint parts 63 are depicted by zigzag patterns in FIG. 5. The inner joint parts 63 are formed by stitching together the upper and lower parts 56, 57 of the partitioning member 50. This structure may however be modified so as to form the inner joint parts 63 by bonding the upper and lower parts 56, 57 with an adhesive.

A pressure-regulating valve 70 is provided in the partitioning member 50 at a middle location in the longitudinal direction and at a substantially middle location in the transverse direction. The pressure-regulating valve 70 functions as a valve capable of selectively allowing and restricting flow of inflation gas G from the upstream section 47 to the downstream section 48 in accordance with a state where the occupant P is restrained by the upstream section 47.

Described below is how the pressure-regulating valve 70 is constructed. The inner joint parts 63, which join the upper and lower parts 56, 57 of the partitioning member 50 to each other are not provided in an area straddling the folding line 51 located at the boundary area connecting the two overlapping portions 61 of the partitioning member 50 to the respective non-overlapping portions 62. The aforementioned unjoined portion located between the two inner joint parts 63 extends in the transverse (widthwise) direction of the vehicle 10 to form a slit, which constitutes an opening 71 interconnecting the upstream section 47 and the downstream section 48 of the airbag 40. The transverse (widthwise) direction of the vehicle 10 referred to herein is the same direction in which an impact is applied to the vehicle 10.

Parts of the pair of overlapping portions 61 close to the opening 71 form a pair of valve body elements 73, 74. More exactly, a portion between the opening 71 and the edge 58E of the end portion 58 of the partitioning member 50 constitutes the valve body element 73 while a portion between the opening 71 and the edge 59E of the end portion 59 of the partitioning member 50 constitutes the valve body element 74. When the two valve body elements 73, 74 come into contact with each other at least in part, at extreme ends 73T, 74T of the respective valve body elements 73, 74 near the edges 58E, 59E, for example, the pressure-regulating valve 70 closes and restricts the flow of the inflation gas G through the opening 71 and between the two valve body elements 73, 74 (refer to FIGS. 18A and 18B). Also, when the opening 71 is opened and the entirety of the valve body element 73 and the entirety of the valve body element 74 are separated from each other, the pressure-regulating valve 70 opens to allow the inflation gas G to flow through the opening 71 and between the two valve body elements 73, 74 (refer to FIG. 18C).

Further, the two overlapping portions 61 of the partitioning member 50, which has the valve body elements 73, 74, are located in the upstream section 47 before the inflatable portion of the airbag 40 is deployed and inflated.

The two overlapping portions 61 are bent upward or downward (upward in this embodiment) in the boundary areas between the overlapping portions 61 and the non-overlapping portions 62 so that the overlapping portions 61 are stacked with the upper part 56 or the lower part 57 of the partitioning member 50. Further, the two band-like overlapping portions 61, which are bent, are joined to the respective fabric portions 43, 44 of the airbag 40 and the non-overlapping portions 62 of the partitioning member 50 by the outer joint parts 54, 55 thereof at both ends in the direction (transverse direction, or the widthwise direction of the vehicle 10) along the inner joint parts 63 (refer to FIGS. 5, 7A and 7B). The outer joint parts 54, 55 of the partitioning member 50 may be formed by stitching or by bonding by use of an adhesive.

The airbag 40 deployed but not inflated (refer to FIGS. 4 and 7A) is initially folded so that the airbag module AM can be accommodated in a compact fashion (hereinafter referred to as an accommodation state) as depicted in FIG. 3. This is for making the airbag module AM suitable for accommodation in the accommodating portion 18, which provides a limited space in the seat back 14.

In this accommodation state, the airbag 40 deployed but not inflated is folded by first to third folding operations. Next, these folding operations will be described.

<First Folding Operation>

In the first folding operation, as shown in FIGS. 11A and 11B, an upper portion of the airbag 40, which has been deployed but not inflated, is folded downward. According to the first folding operation, the upstream section 47 and the downstream section 48 are folded. As shown by a dashed-dotted line in FIG. 11A, for the first folding operation, a folding line 105 (first folding line) is set to extend in the front-rear direction above the inflator assembly 30 in the upstream section 47 and the downstream section 48 of the airbag 40 deployed but not inflated. A portion 106 of the airbag 40 located above the folding line 105 is folded downward along the folding line 105 into the outer side or inner side of the vehicle, as shown an arrow in FIG. 11A. By this first folding operation, the resulting size of the airbag 40 in the up-down direction becomes small as shown in FIG. 12A.

<Second Opening Operation>

After the first folding operation, the airbag 40 is folded by the second folding operation. In the second folding operation, the airbag 40 in FIG. 12A is folded rearward from front. In the second folding operation, the upstream section 47 and the lower protecting portion 49 of the airbag 40 are folded by accordion-folding, and the downstream section 48 is folded by roll-folding.

For the accordion-folding, a plurality of folding lines 107 (second folding lines) are set in the upstream section 47 (including the portion 106) and the lower protecting portion 49 of the airbag 40 to extend in the up-down direction, as shown in FIG. 12A. The distance between adjacent folding lines 107 corresponds to a folding width of the accordion-folding. As shown in FIGS. 12B and 12C, the upstream section 47 and the lower protecting portion 49 of the airbag 40 are folded in an accordion form along these folding lines 107.

More specifically, the airbag 40 is folded rearward from front in a constant width, with alternate folding directions.

For the roll-folding, a plurality of folding lines 108 (second folding lines) are set in the downstream section 48 (including the portion 106) of the airbag 40 to extend in the up-down direction, as shown in FIG. 12A. As shown in FIGS. 12B and 12C, the downstream section 48 is spirally folded rearward from front in sequence along the individual folding lines 108. In other words, the downstream section 48 is repeatedly folded in the same direction. The order of the accordion-folding and the roll-folding is not especially limited, and the accordion-folding and the roll-folding may be carried out simultaneously or substantially simultaneously. As shown in FIGS. 13A and 13B, the airbag is folded into the transitional state having small size in the front-rear direction by the second folding operation including the accordion-folding and the roll-folding.

<Third Folding Operation>

The airbag 40 thus folded into the transitional state by the second folding operation is then folded by a third folding operation. By the third folding operation, of the airbag 40 in the transitional state, a portion corresponding to the lower protecting portion 49 is folded upward. For the third folding operation, a folding line 109 (third folding line) is set to extend in a widthwise direction of the seat 12 (widthwise direction of the vehicle) below the inflator assembly 30. A portion 110 of the airbag 40 located blow the folding lines 109 in the transitional state, is folded forward and upward along the folding line 109 as shown by an arrow in FIG. 13A. As shown in FIGS. 14A and 14B, an overlapping portion 111 is formed in the airbag 40 by the third folding operation, providing the airbag 40 in the accommodation state. In the accommodation state, a size of the airbag 40 in the up-down direction is smaller than that before the third folding operation.

If the airbag 40 is folded into the accommodation state as shown in FIGS. 14A and 14B, the airbag module AM obtains a small size in both the front-rear direction and the up-down direction, and is suitable for accommodation in a narrow accommodating portion 18.

Thereafter, the airbag module AM is held in the accommodation state by holding means, such as a binding tape not shown).

As shown in FIG. 3, the airbag module AM in the accommodation state is stored within the accommodating portion 18 with the inflator assembly 30 located rearward and most of the airbag 40 located forward. As previously mentioned, the bolts 34 extending from the retainer 32 and passed through the inside fabric portion 43 of the airbag 40 are further passed through the side frame portion 15 and fixed thereto by fastening nuts 36 on the bolts 34. As the nuts 36 are fastened on the bolts 34 in this fashion, the inflator assembly 30 is affixed to the side frame portion 15 together with the airbag 40.

As is apparent to those skilled in the art, the inflator assembly 30 may be affixed to the vehicle 10 (side frame portion 15) by different members from the aforementioned bolts 34 and nuts 36.

Referring again to FIG. 1, the side airbag apparatus includes an impact sensor 75 and a control unit 76 in addition to the aforementioned airbag module AM. The impact sensor 75 is an acceleration sensor, for example, attached to the body-side portion 11 of the vehicle 10 (refer to FIG. 2. The impact sensor 75 detects an impact applied from the side to the body-side portion 11. The control unit 76 controls the working of the inflator 31 on the basis of a detection signal output from the impact sensor 75 upon detecting the impact.

While the vehicle 10 is equipped with a seat belt system for restraining the occupant P seated in the seat 12, the seat belt system is not illustrated in the accompanying drawings.

The side airbag apparatus is configured as described in the foregoing. Operation of the side airbag apparatus of the present embodiment is now discussed with reference to a typical mode of operation. FIGS. 18A to 18C are diagrams schematically representing how the pressure-regulating valve 70 varies in shape with the lapse of time after the beginning of the supplying of the inflation gas G. It is to be noted that FIGS. 18A to 18O do not illustrate details of the side airbag apparatus.

In the side airbag apparatus of the embodiment, the control unit 76 does not output the activation signal to the inflator 31 for activating the same when no impact is applied from the side to the vehicle 10 (body-side portion 11) as shown in FIGS. 1 and 2. Therefore, the inflator 31 does not supply the inflation gas G to the inflatable portion of the airbag 40 in this situation and the airbag 40 continues to be stored in the accommodating portion 18 in the accommodation state together with the inflator assembly 30 (refer to FIG. 3) in a side collision and the like. At this point in time, the fabric portions 43, 44 of the airbag 40 are positioned close to each other and the partitioning member 50 is folded in half with the folding line 51 thereof located upstream of the two opposite end portions 52, 53. The two valve body elements 73, 74 are overlaid each other in the upstream section 47 of the airbag 40.

In contrast, if an impact of which force level is equal to or higher than a predetermined value is applied to the body-side portion 11 as a result of a collision, for instance, and the impact sensor 75 detects this situation while the vehicle 10 is running, the impact sensor 75 outputs a detection signal. Upon receiving this detection signal, the control unit 76 outputs the activation signal to the inflator 31 for activating the same. The gas generating agent contained in the inflator 31 generates the high-temperature and high-pressure inflation gas G in response to the activation signal received. This inflation gas G is initially supplied to the upstream section 47 and the lower protecting portion 49 of the upper protecting portion 46 of the inflatable portion. The pressure of the inflation gas is applied to each of the upstream section 47 and the lower protecting portion 49. Thus, each of the upstream section 47 and the lower protecting portion 49 start being inflated to be unfolded (deployed) in the reversed order of the folding process. This is because that the later-folded portion of the airbag 40 restricts unfolding of the first-folded portion.

In this embodiment, the third folding operation is carried out after the second folding operation. In the third folding operation, the lower protecting portion 49 is folded upward to form the overlapping portion 111, and then the lower protecting portion 49 is folded rearward from front, as shown in FIG. 15. Hence, the overlapping portion 111 of the airbag 40 in the accommodation state is first rotated forward and downward to be unfolded (deployed).

Figure 19A:
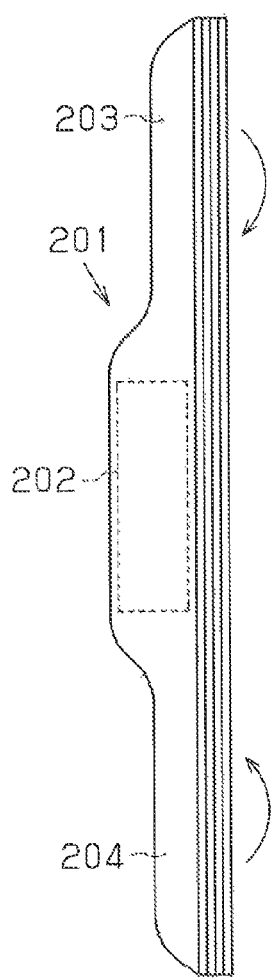
FIG. 19A depicts a conventional side airbag apparatus and is a side view depicting a halfway form (transitional state) of a folding operation of an airbag.
Figure 19B:
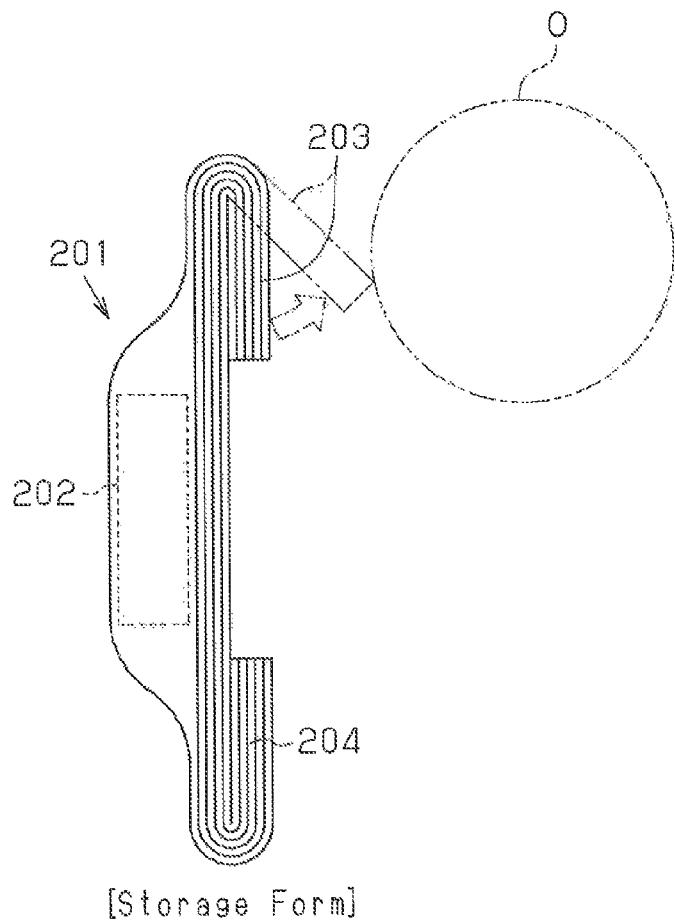
FIG. 19B depicts the conventional side airbag apparatus and is a side view schematically depicting a state where an upper side folded portion in the airbag in its accommodation state is rotated forward and upward to be unfolded.

In this embodiment, the second folding operation is carried out after the first folding operation, i.e., initially the upper portion 106 of the airbag 40 is folded downward, and, then the airbag 40 is folded rearward from front. Therefore, after the overlapping portion 111 is rotated, the airbag 40 in the accommodation state is unfolded (deployed) forward from behind, as shown by a densely dotted section in FIG. 15. At this time, as shown by an alternate long and two short dashed line in FIG. 15, if there is an obstacle O in the deploying direction of the airbag 40, the airbag 40 pushes the obstacle O forward as shown by an arrow. However, unlike the above-described conventional example shown in FIG. 19B, the obstacle O is not strongly pushed upward and forward so that the airbag 40 does not unnecessarily interfere with the obstacle O. After the airbag 40 is unfolded forward from behind, the portion 106 is unfolded upward, as shown in a less-densely dotted section in FIG. 15.

As shown in FIG. 10, the lower protecting portion 49 is deployed and inflated within one side of the seat back 14 without breaking the side support portion 23. A lower portion of the side (side support portion 23) in the seat back 14 on the outer side is pressed by the lower protecting portion 49 having a high internal pressure. By this pressing force, peripheral portion (side support portion 23) of the lower protecting portion 49 is inflated within the seat back 14 forward and inward into the vehicle interior. The side support portion 23 thus inflated strongly pushes a rear portion of the lumbar region PP, which has the highest impact resistance among the upper part of the body of the occupant P, obliquely forward and inward into the vehicle interior as shown by an arrow in FIG. 10.

In this manner, the lower protecting portion 49 is deployed and inflated only within the seat back 14 without breaking the side support portion 23. Therefore, a part of the seat back 14 to be broken becomes shorter as compared with a case where not only the upper protecting portion 46 but also the lower protecting portion 49 breaks the side support portion 23.

The upper protecting portion 46 of the airbag 40 incorporates the folded-in-half partitioning member 50 with the folding line 51 thereof located upstream of the two opposite end portions 52, 53. Moreover, the opposite end portions 52, 53 of the partitioning member 50 are joined to the fabric portions 43, 44 of the airbag 40 at the outer joint parts 54, 55, respectively (refer to FIG. 5). Also, the end portions (upper and lower end portions) of the partitioning member 50 on both sides of the folding line 51 are joined to the two fabric portions 43, 44 of the airbag 40 along the peripheral joint part 45 thereof, respectively (refer to FIG. 7A). Hence, the accordion-folded upstream section 47 is unfolded (deployed) forward from behind. Generally, the accordion-folded portion is easily unfolded and deployed. Hence, the upstream section 47, which is desired to be deployed and inflated more quickly, is swiftly deployed and inflated forward.

Also, the folded-in-half partitioning member 50 is pulled by the fabric portions 43, 44 and assumes the shape of a curved surface. As this curved surface of the partitioning member 50 receives tension in the longitudinal (up-down) direction and the transverse (widthwise) direction, the partitioning member 50 is stretched tight (refer to FIGS. 8 and 9).

Internal pressure PI is applied to the two valve body elements 73, 74 located in the upstream section 47 of the airbag 40 in a direction (thickness direction) in which the valve body elements 73, 74 are overlaid (refer to FIG. 18A). At this time, the internal pressure PI of the inflatable portion of the airbag 40 is not so high as compared to that developed at a point in time when the upstream section 47 restrains the occupant P. This internal pressure PI keeps the valve body elements 73, 74 in tight contact with each other over an entire surface area, so that the valve body elements 73, 74 together create a self-sealing state by which the flow of the inflation gas G between the valve body elements 73, 74 is restricted. Further, the overlapping portions 61 of the partitioning member 50 bent and overlaid on the non-overlapping portions 62 thereof are pressed tight against the non-overlapping portions 62 by the internal pressure PI (refer to FIG. 9). This also makes it easier to close the two valve body elements 73, 74 together.

Referring now to FIG. 8, the partitioning member 50 is configured such that the length L1 in the longitudinal (up-down) direction is larger than the width L2 in the transverse (widthwise) direction (L1>L2). The partitioning member 50 is also configured such that the length L1' in the longitudinal (up-down) direction of a portion thereof, which is located only in the upper protecting portion 46, is longer than the length (L2) in the transverse (vehicle widthwise) direction (L1>L1'>L2). For this reason, the tension applied to the partitioning member 50 in the transverse (widthwise) direction is likely to become larger than the tension applied in the longitudinal (up-down) direction. Since the opening 71 in the partitioning member 50 extends in the transverse (widthwise) direction in which the larger tension is likely to be applied in this embodiment, the opening 71 tends to be closed.

Although the tensions applied to the partitioning member 50 in the transverse and longitudinal directions differ in strength as mentioned above, the tension is exerted in the longitudinal (up-down) direction, potentially causing the opening 71 to become open. Nevertheless, the two valve body elements 73, 74 are closed together at least at the extreme ends 73T, 74T thereof. This is because, even if such a force that tends to pull and open the opening 71 is exerted with the partitioning member 50 stretched tight to pull the opening 71 in the longitudinal direction (up-down direction), the force acting on the valve body elements 73, 74 becomes smaller in a direction going away from the opening 71. The force thus exerted is maximized at the opening 71 and minimized at the extreme ends 73T, 74T of the valve body elements 73, 74 so that the valve body elements 73, 74 are held closed together.

Further, the overlapping portions 61 of the partitioning member 50 bent toward the non-overlapping portions 62 thereof are joined to the respective fabric portions 43, 44 of the airbag 40 together with the opposite end portions 52, 53 by the outer joint parts 54, 55 at both ends in a direction in which the slit (inner joint parts 63) extends (refer to FIG. 9) in the present embodiment. Thus, when the upstream section 47 of the airbag 40 is deployed and inflated, a strong tension is exerted not only on the partitioning member 50 in the transverse (widthwise) direction but also on the overlapping portions 61 in the same direction.

When at least parts of the two valve body elements 73, 74 come into contact with each other, the pressure-regulating valve 70 is brought into a closed state. Thus, the inflation gas G in the upstream section 47 of the airbag 40 is kept from flowing into the downstream section 48 thereof between the two valve body elements 73, 74 and through the opening 71 at this time. As the flow of the inflation gas G is restricted in this fashion, it is difficult for the inflation gas G to flow through the opening 71. The inflation gas G in the upstream section 47 does not flow into the downstream section 48 through the opening 71 at all or just flows in minute quantities. Consequently, the inflation gas G is held in the upstream section 47 in quantity and the internal pressure of the airbag 40, especially that of the upstream section 47, begins to increase.

In this embodiment, the upper protecting portion 46 of the airbag 40 is divided into the upstream section 47 and the downstream section 48 by the partitioning member 50. The upstream section 47 has a smaller volume than that of the entire upper protecting portion 46 (provided that the upper protecting portion 46 is not divided into the two sections 47, 48). Therefore, the internal pressure of the upstream section 47 increases more quickly compared to a case where the upper protecting portion 46 is not divided. In particular, the upstream section 47 is connected to the downstream section 48 only through a passage between the two valve body elements 73, 74 and, thus, the inflation gas G can never flow into the downstream section 48 without passing between the valve body elements 73, 74. For this reason, it is unlikely that the rate of increase in the internal pressure of the upstream section 47 would decrease as a result of the downstream flow of the inflation gas G.

As the upstream section 47 is deployed and inflated while stretching out from a folded state, the seat pad 16 of the seat back 14 is pushed outward by the upstream section 47 of the airbag 40 and eventually broken at the breakable portion 21 (refer to FIG. 3).

If the upstream section 47 is deployed and inflated in a state where the partitioning member 50 is located in the seat back 14, i.e., if the upstream section 47 is deployed and inflated only within the seat back 14, it is necessary that the side of the seat back 14 be broken only by a force applied from the upstream section 47, which is inflated in the widthwise (vehicle widthwise) direction of the seat 12.

In this regard, in the present embodiment, the upstream section 47 is deployed and inflated in a state where the partitioning member 50 is located in front of the seat back 14. Hence, a force applied from the upstream section 47, which is inflated in the widthwise (vehicle widthwise) direction of the seat 12, and a force applied from the upstream section 47, which is inflated forward, are applied to the seat back 14. A greater force is thus applied to the side of the seat back 14, which is easily broken.

Figure 6:
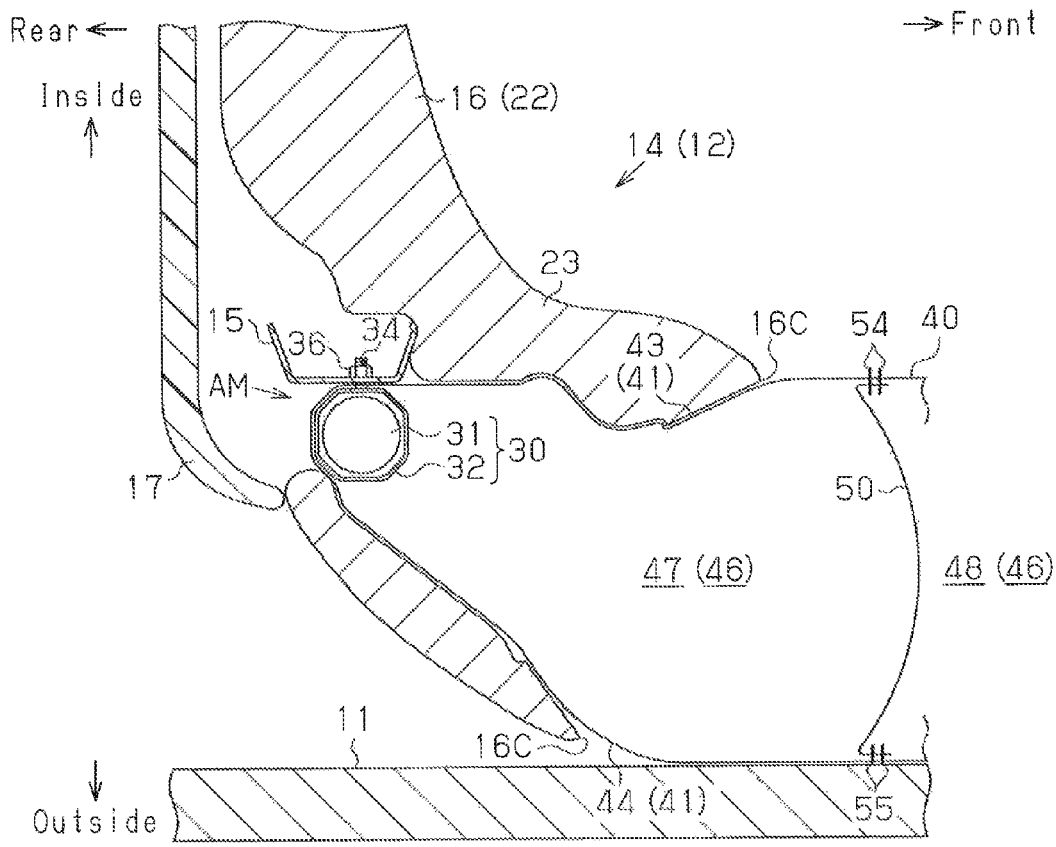
FIG. 6 is a partially cross-sectional plan view depicting a state in which an upper protecting portion has, from a state shown in FIG. 3, popped out of the seat back and has been deployed and inflated with part of the upper protecting portion left within an accommodating portion.

Then, the upstream section 47 pops out forward through a broken part of the seat back 14 with part of the upstream section 47 left within the accommodating portion 18 as depicted in FIG. 6

Inflation gas G is supplied to the upper protecting portion 46 even after the upstream section 47 has popped out through the seat back 14, and as shown in FIG. 17, the upstream section 47 is deployed, while stretching out forward between the body-side portion 11 and the shoulder PS of the occupant P. As shown in FIG. 7, the upstream section 47 is deployed and inflated on a side of a region including at least the rear end part PSR and the middle part PSC of the shoulder PS. At this time, the upstream section 47 has a higher internal pressure than the downstream section 48. Although the upstream section 47 is deployed on the side of the shoulder PS, the shoulder PS has higher impact resistance than the thorax PT.

The upstream section 47 starts being pressed against the shoulder PS of the occupant P by the body-side portion 11 intruding inward into the vehicle interior. As shown by an arrow in FIG. 17, the shoulder PS is pushed inward into the vehicle interior (or in a direction going away from the body-side portion 11), and an upper portion of the upper part of the body of the occupant P is chiefly restrained by the upstream section 47.

Since, the shoulder PS is not so curved inward into the vehicle interior as the back PB, the shoulder PS can be pushed inward more easily into the vehicle interior by the upstream section 47.

Also, the shoulder PS is a body region protruding most outward in the widthwise direction of the seat 12 (or outward toward the body-side portion 11 of the vehicle 10) among the upper part of the body of the occupant P so that the shoulder PS is nearest to the body-side portion 11. The distance between the body-side portion 11 and the upper part of the body of the occupant P is at a minimum at the shoulder PS before any impact is applied to the vehicle 10.

Therefore, compared to any part of the airbag 40 that pushes other upper regions of the upper part of the body of the occupant P, the upstream section 47 begins to push the upper part (shoulder PS) of the body of the occupant P with a small amount of inflation. The upstream section 47 begins to press against the occupant P in a short time after the beginning of deployment and inflation of the upstream section 47, that is, at an early point in time. Additionally, compared to the back PB, the shoulder PS has higher resistance to the impact applied from the side to the upper part of the body of the occupant P. The shoulder PS so characterized is forcefully pushed by the upstream section 47 of the upper protecting portion 46 of which internal pressure rises at an early point in time.

The upstream section 47 presses against the shoulder PS and the lower protecting portion 49 presses against the lumbar region PP in the above-described fashion, the upper part of the body of the occupant P is moved inward into the vehicle interior, as shown by solid lines in FIG. 17. Alternate long and two short dashed lines in FIG. 17 show a position of the occupant P before the occupant P is moved. By this movement, the distance between the upper part of the body of the occupant P and the body-side portion 11 is increased, thereby providing a space to allow the downstream section 48 of the airbag 40 to be deployed and inflated.

The larger the area of the shoulder PS that receives a pushing force applied by the upstream section 47 of the airbag 40, the more efficiently the upstream section 47 pushes the shoulder PS inward and moves the occupant P farther into the vehicle interior. As at least the region of the body of the occupant P including at least the rear end part PSR and the middle part PSC of the shoulder PS is thus pushed by the upstream section 47, the shoulder PS is pushed inward and the occupant P is moved farther into the vehicle interior.

Since the upstream section 47 of the upper protecting portion 46 of the airbag 40 is chiefly deployed and inflated in the initial stage of the gas feeding period, during which the inflation gas G is supplied into the upper protecting portion 46 as mentioned above, the occupant P goes in contact with and receives pressure of the upper protecting portion 46 mostly from the upstream section 47 thereof.

At this point in time, the two valve body elements 73, 74 are kept in tight contact with each other over the entire surface area thereof (or in a closed state), allowing the inflation gas G to be supplied into the upstream section 47. At this time, an external force applied to the upstream section 47 by the body-side portion 11 causes the pressure-regulating valve 70 to start opening.

It follows that, from a halfway point in time of the gas feeding period, during which the inflation gas G is supplied to the upper protecting portion 46 of the airbag 40, the external force is applied to the upper protecting portion 46 as a result of restraining the occupant P, so that the upper protecting portion 46 is pushed and deformed in the transverse (widthwise) direction of the vehicle 10. Consequently, a high tension that has been applied to the partitioning member 50 in the transverse (widthwise) direction decreases and a tension applied in the longitudinal (up-down) direction increases.

Also, due to the aforementioned deformation of the upper protecting portion 46, the internal pressure of the upstream section 47 further increases and the partitioning member 50 is pushed toward the downstream section 48 (refer to FIG. 18B) so that the tension applied to the partitioning member 50 changes. Then, the difference between the tensions applied in the longitudinal and transverse directions decreases as a result of the aforementioned change in the tensions. Consequently, deformation of the opening 71 located in the partitioning member 50 is allowed, and movement of the valve body elements 73, 74 located within the partitioning member 50 is allowed.

On the other hand, the overlapping portions 61 of the partitioning member 50 are overlaid on the non-overlapping portions 62 thereof and joined to the respective fabric portions 43, 44 of the airbag 40 by the outer joint parts 54, 55 at both ends in the transverse (widthwise) direction. Therefore, portions of the overlapping portions 61 close to the outer joint parts 54, 55 exert a strong force to maintain an overlapping state of the overlapping portions 61 and the non-overlapping portions 62 of the partitioning member 50. This force becomes smaller in a direction going away from the outer joint parts 54, 55 and reaches a minimum at a middle part of the overlapping portions 61 in the transverse (widthwise) direction, or at the two valve body elements 73, 74. For this reason, the overlapping portions 61 are deformed in the longitudinal (up-down) direction only at the valve body elements 73, 74 and nearby areas thereof when stretched in the transverse (widthwise) direction.

When the opening 71 of the partitioning member 50 opens to a certain extent, the two valve body elements 73, 74 of the overlapping portions 61 receive the high internal pressure P1 from the upstream section 47 and pushed (turned back) toward the downstream section 48 of the airbag 40 through the opening 71. When the width W1 of the opening 71 in the up-down direction is narrow, the extreme ends 73T, 74T of the two valve body elements 73, 74 come into contact with each other so that the valve body elements 73, 74 are closed together at the extreme ends 73T, 74T (refer to FIG. 18B). This situation persists for a period of time when the aforementioned width W1 of the opening 71 is narrower than the sum of the widths W2 (2·W2) of the individual valve body elements 73, 74 (refer to FIG. 18C).

When the width W1 of the opening 71 becomes larger than the sum of the widths W2 (2·W2) of the two valve body elements 73, 74, the extreme ends 73T, 74T thereof are separated from each other (refer to FIG. 18O) and the pressure-regulating valve 70 opens. When the pressure-regulating valve 70 opens in this way, the inflation gas S within the upstream section 47 is allowed to flow into the downstream section 48 through the opening 71 and between the two valve body elements 73, 74.

When the downstream flow of the inflation gas G commences, the internal pressure of the upstream section 47, which has been increasing, begins to decrease. Because the body-side portion 11 continues to intrude farther inward into the vehicle interior, however, the upstream section 47 of the upper protecting portion 46 of the airbag 40 is pushed by the occupant P.

Inflation gas S flowing into the downstream section 48 causes the internal pressure of the downstream section 48 to start increasing. The roll-folded downstream section 48 is less likely to be unfolded as compared with the accordion-folded upstream section 47. However, the roll-folded downstream section 48 is less likely to be hindered by an obstacle from being deployed, and can easily enter a narrow space between the occupant P and the body-side portion 11.

Consequently, the occupant P is pushed against not only the upstream section 47 but also the downstream section 48 of the upper protecting portion 46 and, thus, the occupant P is restrained by both the upstream section 47 and the downstream section 48.

The downstream section 48 of the airbag 40 tends to be unfolded on a side of the thorax PT through the reversed order of the earlier-described folding process thereof. The thorax PT has lower impact resistance than the shoulder PS and the lumbar region PP but the downstream section 48 is deployed at an inflatable portion lower than that of the upstream section 47. At this time, the distance between the body-side portion 11 and the occupant P has been increased by the upstream section 47 and the lower protecting portion 49. Hence, a space for deploying and inflating the downstream section 48 is secured, and the downstream section 48 can be deployed and inflated forward more easily as compared with a case where the aforementioned distance is not increased (see FIG. 17).

The airbag 40 is positioned between the upper part of the body of the occupant P and the body-side portion 11 of the vehicle 10, which intrudes farther into the vehicle interior, in the above-described fashion. The upper part of the body of the occupant P is pushed in the vehicle interior and restrained by the airbag 40, which has been deployed and inflated. Consequently, the inflatable portion of the airbag 40 alleviates the impact transmitted from the side through the body-side portion 11 to the upper part of the body of the occupant P to protect the same.

The side airbag apparatus of the present embodiment described so far in detail confers the following advantages:

(1) The upper portion (portion 106) of the airbag 40 deployed but not inflated is folded initially by the first folding operation, in which the upper portion of the airbag 40 is folded downward. Then the airbag 40 thus folded by the first folding operation is folded by the second folding operation, in which the airbag 40 is folded rearward from front, thereby providing the airbag in the accommodation state (FIG. 11A and FIGS. 12A to 12C).

Hence, the airbag 40 in the accommodation state is first unfolded (deployed) forward from behind and then, the upper portion 106 of the airbag can be deployed, upward. As a result, even if there is an obstacle O in the deploying direction of the airbag 40, it is possible to prevent the airbag 40 from unnecessarily interfering with the obstacle O.

(2) The upper protecting portion 46 of the airbag 40 is divided by the partitioning member 50 into the upstream section 47, to which inflation gas G is first supplied, and the downstream section 48 adjoining the upstream section 47 at the front thereof. The partitioning member 50 is provided with the valve (pressure-regulating valve 70) which restricts and allows flow of inflation gas G from the upstream section 47 to the downstream section 48 in accordance with a status in which the occupant P is restrained by the upstream section 47 (FIG. 7A). The upstream section 47 and the downstream section 48 are folded by the first folding operation (FIG. 11). After the first folding operation, the airbag 40 is folded by the second folding operation, in which the upstream section 47 is accordion-folded, and the downstream section 48 is roll-folded (FIGS. 12A, to 12C).

Before the occupant P is restrained by the upstream section 47, the valve (pressure-regulating valve 70) restricts the flow of the inflation gas G, and especially the internal pressure of the upstream section 47 rises in the upper protecting portion 46. Accordingly, the upstream section 47 is deployed and inflated, and the upstream section 47 of the upper protecting portion 46 is pushed against the upper portion of the upper part of the body of the occupant. P.

When the occupant P is restrained by the upstream section 47, the flow of the inflation gas G is allowed by the valve (pressure-regulating valve 70), and the internal pressure of the downstream section 48 rises. Accordingly, the downstream section 48 is deployed and inflated, and not only the upstream section 47 of the upper protecting portion 46 but also the downstream section 48 is pushed against the upper portion of the upper part of the body of the occupant P.

In this manner, the valve (pressure-regulating valve 70) can selectively allow and restrict the flow of inflation gas from the upstream section 47 to the downstream section 48 in accordance with the restraining status of the upstream section 47.

Further, since the upstream section 47 is folded by the accordion-folding, the upstream section 47 can swiftly be deployed and inflated forward. Since the downstream section

48 is folded by the roll-folding, the downstream section 48 can easily enter a narrow space between the occupant P and the body-side portion 11.

(3) The valve (pressure-regulating valve 70) includes an opening 71 and a pair of valve body elements 73 and 74 (FIG. 9).

Before the occupant is restrained by the upstream section 47, both the valve body elements 73 and 74 are pressed to come into contact with each other by inflation gas in the upstream section 47, and thereby to restrict the flow of inflation gas through the opening 71 (FIGS. 18A and 18B). When the occupant is restrained by the upstream section 47, an external force is applied from the occupant as a result of restraining to press and deform the upper protecting portion 46. At this time, the partitioning member 50 is caused to warp, and both the valve body elements 73 and 74 are separated from each other to allow the flow of inflation gas through the opening (FIG. 18C).

(4) The position of the partitioning member 50 in the upper protecting portion 46 is set such that when the upstream section 47 is deployed and inflated, the partitioning member 50 is located in front of the seat back 14 (FIG. 6).

Hence, when the upstream section 47 is deployed and inflated, a greater force can be applied to the side of the seat back 14 as compared with a case where the partitioning member 50 is located within the seat back 14, easily breaking the seat back 14.

(5) The upstream section 47 is configured to be deployed and inflated on the side of the shoulder PS of the occupant P, and the downstream section 48 is configured to be deployed and inflated on the side of the thorax PT (FIG. 7A).

Hence, in an initial stage where restraining of the occupant P is started, the shoulder PS is strongly pushed by the upstream section 47, of which the internal pressure rises at an early point. The thorax PT can be pushed by the downstream section 48, of which the internal pressure does not become high as compared with the upstream section 47. The thorax PT has lower impact resistance than the shoulder PS among the upper part of the body.

In this manner, the pressure distribution of the upper protecting portion 46 in the airbag 40 is appropriately set based on the difference in impact resistance in the upper portion of the upper part of the body of the occupant P including the shoulder PS and the thorax PT, and thereby the upper portion (shoulder PS and thorax PT) of the upper part of the body of the occupant P can be protected effectively from an impact.

(6) The inflatable portion of the airbag 40 further includes the lower protecting portion 49, which is deployed and inflated on a side of a lower portion of the upper part of the body of the occupant P (FIG. 7A).

After the second folding operation, the lower portion 110 corresponding to the lower protecting portion 49 is folded by the third folding operation (FIG. 13A).

The airbag 40 including the lower protecting portion 49 as above-described has an elongated shape in the up-down direction. However, since the airbag 40 is folded by the third folding operation after the second folding operation, the airbag 40 in the accommodation state is short and compact in the up-down direction.

When an impact is applied, to a vehicle from a side of the seat 12 due to a side collision or the like, it is possible to unfold (deploy) the lower portion 110 (overlapping portion 111) first.

(7) The lower protecting portion 49 pushes the lumbar region PP of the occupant P inward and moves the occupant P further into the vehicle. This operation becomes more effective as the larger area of the lumbar region PP of the occupant P receives a pushing force applied from the lower protecting portion 49.

In this regard, the lower protecting portion 49 is made to be deployed and inflated on the side of the rear portion of the lumbar region PP of the occupant P in this embodiment (FIG. 10). This is because in the lumbar region PP of the occupant P, the rear portion of the pelvis 100 including mainly the ilium 101 has a strong or tough skeleton with respect to a load applied from a side as compared with a portion corresponding to a great trochanter 102 located at a front portion of the pelvis 100, as shown in FIG. 10.

(8) The end portions 58, 59 of the upper and lower parts 56, 57 of the partitioning member 50 are overlaid with the edges 58E, 59E of the end portions 58, 59 aligned with each other, respectively, to form the pair of band-like overlapping portions 61. Further, the partitioning member 50 is formed by joining the upper and lower parts 56, 57 thereof by the pair of inner joint parts 63 provided along the boundary areas between the two each overlapping portions 61 and non-overlapping portions 62. The upper and lower parts 56, 57 are not joined together in an area between the two inner joint parts 63 and the opening 71 is formed in this area of the partitioning member 50. Parts of the two overlapping portions 61 close to the opening 71 form the valve body elements 73, 74 (FIG. 9).

It is therefore possible to form the partitioning member 50 together with the opening 71 and the two valve body elements 73, 74 at one time by joining the overlapping portions 61 and the non-overlapping portions 62 of the upper and lower parts 56, 57 along the boundary areas thereof with part of the boundary areas left unjoined. This means that no special work load is required for forming the opening 71 and the pair of valve body elements 73, 74.

In particular, the two valve body elements 73, 74 are formed integrally with the partitioning member 50. More exactly, one valve body element 73 is formed integrally with the upper part 56 of the partitioning member 50 while the other valve body element 74 is formed integrally with the lower part 57. Therefore, compared to a case where the two valve body elements 73, 74 are formed with components differing from the partitioning member 50 (i.e., the upper and lower parts 56, 57), it is possible to reduce the number of components. Additionally, it is not necessary to join any separate components to the upper and lower parts 56, 57 of the partitioning member 50.

(9) An upper part of the inflatable portion of the airbag 40 is divided by the partitioning member 50 into front and rear sections (i.e., the upstream section 47 and the downstream section 48). As the partitioning member 50 is provided with the pressure-regulating valve 70, the downstream section 48 is not deployed or inflated at an early stage of deployment and inflation of the inflatable portion (before the upstream section 47 restrains the occupant P).

Therefore, even if an obstacle exists in an area where the downstream section 48 will be deployed and inflated (at the front of the seat back 14) in the early stage of deployment and inflation of the inflatable portion, it is possible to prevent the downstream section 48 from pushing against the obstacle.

The foregoing embodiment of the present invention may be modified as described below.

<Modification of Partitioning Member 50 and Valve>

At least one of the upper and lower parts 56, 57 of the partitioning member 50 may be made of two pieces of cloth that are joined together along the folding line 51.

The opposite end portions 52, 53 of the partitioning member 50 are joined to the fabric portions 43, 44 of the airbag 40 at the outer joint parts 54, 55, respectively. The outer joint parts 54, 55 may be located within the upstream section 47 or within the downstream section 48.

Also, the partitioning member 50 may be configured such that one of the outer joint parts 54, 55 is located within the upstream section 47 and the other within the downstream section 48.

The opening 71 and the inner joint parts 63 need not necessarily be formed in the direction perpendicular to the folding line 51 of the partitioning member 50 but may be formed in a direction obliquely intersecting the folding line 51 or along the folding line 51.

The partitioning member 50 may be made of a single component (a piece of cloth).

Areas of the overlapping portions 61 of the partitioning member 50 that function as the valve body elements 73, 74 are portions corresponding to the opening 71 (i.e., portions close to the opening 71, more exactly, portions between the opening 71 and the edges 58E, 59E). Therefore, if at least the extreme ends 73T, 74T of the valve body elements 73, 74 are to be held in contact with each other to close the valve body elements 73, 74 together while the upstream section 47 is being deployed and inflated, parts of the overlapping portions 61 located apart from the opening 71 may be modified in shape or structure. For example, the parts of the overlapping portions 61 located, apart from the opening 71 may be joined together entirely or in part. In this case, the parts of the overlapping portions 61 may be joined together by stitching or adhesive bonding. If the structure of the overlapping portions 61 located apart from the opening 71 is so modified, it is possible to cause only the areas of the overlapping portions 61 corresponding to (close to) the opening 71 to function as the two valve body elements 73, 74 and prevent areas of the overlapping portions 61 not corresponding to (apart from) the opening 71 from unnecessarily moving, a phenomenon in which the overlapping portions 61 flutter in part.

One of other forms of modifications that may be made is to form a notch at least in part of the areas of the overlapping portions 61 located apart from the opening 71.

Also, the partitioning member 50 and the valve body elements 73, 74 may be made of different materials.

The folding line 51, along which the partitioning member 50 is folded in half, may be slightly inclined with respect to the up-down direction of the airbag module AM.

A portion where the upper and lower parts 56, 57 of the partitioning member 50 are not joined to each other by the two inner joint parts 63 need not necessarily be located in the area straddling the folding line 51 but may be provided in an area shifted from the folding line 51 in a direction perpendicular thereto.

The partitioning member 50 may be provided with a plurality (more than one pair) of inner joint parts 63 having a plurality of openings formed therebetween.

Also, the pair of overlapping portions 61 including the two valve body elements 73, 74 may be located in the downstream section 48, instead of the upstream section 47, before the inflatable portion of the airbag 40 is deployed and inflated.

The partitioning member 50, which is folded in half along the folding line 51 such that the opposite end portions 52, 53 of the partitioning member 50 face close to each other, may be located in the inflatable portion of the airbag 40, which has been deployed but not yet inflated under conditions where the folding line 51 is located downstream of the opposite end portions 52, 53. In this case, the overlapping portions 61 including the two valve body elements 73, 74 may be located within the downstream section 48 of the airbag 40 before the inflatable portion thereof is deployed and inflated.

A pair of band-like overlapping portions may be formed with the end portions 58, 59 of the upper and lower parts 56, 57 of the partitioning member 50 overlaid with each other under conditions where the edges 58E, 59E of the end portions 58, 59 are not aligned with each other.

The above-described valve may allow and restrict the flow of inflation gas from the upstream section 47 to the downstream section 48 in accordance with the internal pressure of the upstream section 47. The valve may be a slit or a vent hole, for example. In this case, when the internal pressure is low, the valve may restrict the flow of inflation gas while, when the internal pressure exceeds a certain value, the restriction of the flow may be canceled, i.e., the flow may be allowed.

<Modification of Inflatable Portion>

While almost the entirety of the airbag 40 may be formed of the inflatable portion thereof as in the foregoing embodiment, the airbag 40 may be configured to partially have a non-inflatable portion, into which the inflation gas G is not supplied.

The inflatable portion may be divided into three or more sections by a plurality of partitioning members. In this case, among any two adjacent sections divided by one of the partitioning members in the flow direction of the inflation gas G, one located on an upstream side (a section closer to the inflator 31) is referred to as an upstream section and the other located on a downstream side (a section farther away from the inflator 31) is referred to as a downstream section. A pressure-regulating valve is provided in the partitioning member located between the upstream section and the downstream section.

The lower protecting portion 49 may be deployed and inflated on a side of a region wider than the rear portion of the lumbar region PP, e.g., on a side of the entire lumbar region PP if the lower protecting portion 49 is deployed and inflated only within the seat back 14.

The lower protecting portion 49 may break the seat back 14 to be deployed and inflated forward.

<Correction of Folding of Airbag 40>

According to the embodiment, in the first folding operation of the airbag 40, which has been deployed but not inflated, the airbag 40 is folded downward along the folding line 105 such that the upper portion of the airbag 40 is located on the outer side or inner side. Alternatively, the upper portion of the airbag 40 may be folded downward such that the upper portion is located on the inner side of the airbag 40, i.e., between the inside fabric portion 43 and the outside fabric portion 44. This folding manner is referred to as inward folding. For the first folding operation, folding lines extending in the front-rear direction are set respectively for the inside fabric portion 43 and the outside fabric portion 44 of the airbag 40. In the fabric portions 43 and 44, portions thereof located above the folding line are folded between portions of the fabric portions below the folding line. By these folding operations, the portions located above the folding lines enter the airbag 40 to be hidden.

The second folding operation may be different from the above-described embodiment. For example, in the second folding operation, both the upstream section 47 and the downstream section 48 may be folded by the accordion-folding, or may be folded by the roll-folding. Contrary to the above-described embodiment, in the second folding operation, the upstream section 47 may be folded by the roll-folding and the downstream section 48 may be folded by the accordion-folding.

<Modification of Inflator Assembly 30>

The inflator assembly 30 may be provided outside the airbag 40. In this case, the side airbag apparatus may be configured such that the inflator 31 and the upstream section 47 are interconnected by a pipe and the inflation gas G is supplied from the inflator 31 to the upstream section 47 through this pipe.

<Modification of Accommodating Portion 18 of Airbag Module AM>

The side airbag apparatus may be configured such that the accommodating portion 18 is located in the body-side portion 11 of the vehicle 10, instead of the seat back 14 of the seat 12, and the airbag module AM is incorporated in the accommodating portion 18.

<Other Modifications>

The present invention may also be applied to a side airbag apparatus that protects, against an impact of a side collision or the like, not only a body region from the lumbar region PP to the thorax PT and the shoulder PS, but also a body region from the lumbar region PP to the thorax PT, a body region from the lumbar region PP to the shoulder PS, a body region from the lumbar region PP to the head, and a body region located above the lumbar region PP (except for the lumbar region PP), e.g., the thorax PT.

The present invention is also applicable to a side airbag apparatus designed to protect the occupant P from an impact applied from the side (along the longitudinal direction of the vehicle 10) to the seat 12, which is installed in such a way that the seat back 14 is not oriented forward but in a lateral direction (widthwise direction) of the vehicle 10.

Vehicles to which the side airbag apparatus according to the present invention is applied include various industrial vehicles in addition to private automobiles.

Furthermore, the vehicles mentioned thus far in the present description include any kind of vehicles for transpiration intended to carry any seated person. For examples, vehicles include aircrafts and vessels.

Therefore, the present examples and embodiments are to be considered as illustrative and not restrictive and the invention is not to be limited to the details given herein, but may be modified within the scope and equivalence of the appended claims.

The invention claimed is:

1. A side airbag apparatus comprising:
   a gas generating source, which generates inflation gas in response to an impact applied from a side of a seat of a vehicle;
   an airbag, which is deployed and inflated forward by the inflation gas on a side of an occupant seated in the seat; and
   an accommodating portion, which is located in the vicinity of a side of the occupant and accommodates the airbag folded into an accommodation state,
   wherein the airbag in the accommodation state is formed by folding the airbag deployed but not inflated first by a first folding operation, in which an upper portion of the airbag is folded downward, and subsequently by a second folding operation, in which the airbag is folded rearward from front,
   the airbag includes an inflatable portion, which is inflated by the inflation gas, and a partitioning member, which divides the inflatable portion into an upstream section, to which inflation gas is supplied, and a downstream section located in front of the upstream section and adjacent to the upstream section,
   the partitioning member includes a valve for selectively allowing and restricting flow of the inflation gas from the upstream section to the downstream section in accordance with a state in whish the upstream section receives an external force by restraining an occupant or in accordance with an internal pressure of the upstream section, and
   the upstream section and the downstream section are folded by the first folding operation.

2. The side airbag apparatus according to claim 1, wherein the second folding operation includes an accordion-folding and a roll-folding, in the according-folding,
   the upstream section is folded such that folding directions are changed alternately, and
   in the roll-folding, the downstream section is repeatedly folded in the same direction.

3. The side airbag apparatus according to claim 2, wherein the valve includes an opening and a pair of valve body elements,
   in an initial stage where the inflation gas is supplied, the valve body elements are pushed to remain in contact with each other by the inflation gas supplied into the upstream section to restrict the flow of the inflation gas from the upstream section to the downstream section through the opening, and
   in a state where the upstream section has been inflated and receives the external force by restraining the occupant, the valve body elements are separated from each other to allow the flow of the inflation gas through the opening when the partitioning member is caused to warp by the external force.

4. The side airbag apparatus according to claim 2, wherein the upstream section is deployed and inflated on a side of a shoulder of the occupant, and
   the downstream section is deployed and inflated on a side of a thorax of the occupant.

5. The side airbag apparatus according to claim 1, wherein the airbag further includes a lower protecting portion, which is deployed and inflated on a side of a lower portion of an upper part of the body of the occupant, and
   after the second folding operation, the airbag in the accommodation state is formed by further folding a lower portion of the airbag that corresponds to the lower protecting portion by a third folding operation, in which the lower portion of the airbag is folded upward.

6. The side airbag apparatus according to claim 1, wherein in the first folding operation, the airbag is folded along a first folding line extending in a front-rear direction above the gas generating source, and
   in the second folding operation, the airbag is folded along a plurality of second folding lines extending in an up-down direction.

7. The side airbag apparatus according to claim 1, wherein the valve includes an opening and a pair of valve body elements,
   in an initial stage where the inflation gas is supplied, the valve body elements are pushed to remain in contact with each other by the inflation gas supplied into the upstream section to restrict the flow of the inflation gas from the upstream section to the downstream section through the opening, and
   in a state where the upstream section has been inflated and receives the external force by restraining the occupant, the valve body elements are separated from each other to allow the flow of the inflation gas through the opening when the partitioning member is caused to warp by the external force.

8. The side airbag apparatus according to claim 1, wherein
the upstream section is deployed and inflated on a side of a shoulder of the occupant, and
the downstream section is deployed and inflated on a side of a thorax of the occupant.

* * * * *